(12) United States Patent
Watanabe

(10) Patent No.: US 10,384,676 B2
(45) Date of Patent: Aug. 20, 2019

(54) TRAVEL CONTROL APPARATUS

(71) Applicant: TOYOTA JIDOSHA KABUSHIKI KAISHA, Toyota-shi, Aichi (JP)

(72) Inventor: Yoshinori Watanabe, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 166 days.

(21) Appl. No.: 15/421,697

(22) Filed: Feb. 1, 2017

(65) Prior Publication Data

US 2017/0247029 A1 Aug. 31, 2017

(30) Foreign Application Priority Data

Feb. 25, 2016 (JP) ................. 2016-034141

(51) Int. Cl.

| | |
|---|---|
| *B60W 30/00* | (2006.01) |
| *B60W 30/09* | (2012.01) |
| *B60W 10/04* | (2006.01) |
| *B60W 10/20* | (2006.01) |
| *B60W 30/095* | (2012.01) |

(Continued)

(52) U.S. Cl.
CPC ............ *B60W 30/09* (2013.01); *B60W 10/04* (2013.01); *B60W 10/20* (2013.01); *B60W 30/0956* (2013.01); *G05D 1/0219* (2013.01); *G05D 1/0234* (2013.01); *G05D 1/0238* (2013.01); *G08G 1/16* (2013.01); *B60W 2420/42* (2013.01); *B60W 2420/52* (2013.01); *B60W 2520/10* (2013.01); *B60W 2550/10* (2013.01); *B60W 2550/143* (2013.01); *B60W 2550/146* (2013.01); *B60W 2550/30* (2013.01); *B60W 2720/10* (2013.01); *B60W 2720/24* (2013.01); *G05D 2201/0213* (2013.01)

(58) Field of Classification Search
None
See application file for complete search history.

(56) References Cited

U.S. PATENT DOCUMENTS 5,926,126 A * 7/1999 Engelman .......... B60K 31/0008
340/435
6,823,241 B2 * 11/2004 Shirato .............. G06K 9/4609
701/1

(Continued)

FOREIGN PATENT DOCUMENTS

JP 4211794 A 1/2009

*Primary Examiner* — Truc M Do
(74) *Attorney, Agent, or Firm* — Sughrue Mion, PLLC

(57) ABSTRACT

A travel control apparatus includes: a transformation unit configured to project the lane and object on a lane coordinate system in which a center line of the lane is a first coordinate axis and an axis orthogonal to the first coordinate axis is a second coordinate axis by performing a coordinate transformation based on the shape of the lane and the position of the object in a plane coordinate system; an area calculation unit configured to calculate a travelable area in which the vehicle can travel in the lane coordinate system; a travel trajectory generation unit configured to perform an inverse transformation of the coordinate transformation by the transformation unit based on the travelable area, and to generate a travel trajectory of the vehicle in the plane coordinate system; and a control unit configured to perform a steering control on the vehicle.

9 Claims, 20 Drawing Sheets

(51) Int. Cl.
  *G05D 1/02* (2006.01)
  *G08G 1/16* (2006.01)

(56) References Cited

U.S. PATENT DOCUMENTS

| | | | |
|---|---|---|---|
| 2002/0044080 A1* | 4/2002 | Shirai | G01S 13/931 342/70 |
| 2005/0107939 A1* | 5/2005 | Sadano | B60T 8/17557 701/70 |
| 2007/0043502 A1* | 2/2007 | Mudalige | B60T 7/22 701/301 |
| 2009/0024357 A1 | 1/2009 | Aso et al. | |
| 2009/0067675 A1* | 3/2009 | Tan | G06K 9/00798 382/104 |
| 2010/0030430 A1* | 2/2010 | Hayakawa | B60T 8/17557 701/42 |
| 2010/0253493 A1* | 10/2010 | Szczerba | G01S 13/723 340/435 |
| 2010/0256852 A1* | 10/2010 | Mudalige | G08G 1/163 701/24 |
| 2011/0098927 A1* | 4/2011 | Takazawa | B60W 30/16 701/300 |
| 2011/0231095 A1* | 9/2011 | Nakada | B60W 30/12 701/301 |
| 2012/0271540 A1* | 10/2012 | Miksa | G01C 21/30 701/409 |
| 2014/0267415 A1* | 9/2014 | Tang | G06T 11/60 345/633 |
| 2015/0062141 A1* | 3/2015 | Hayasaka | B60R 1/00 345/581 |
| 2015/0070158 A1* | 3/2015 | Hayasaka | G01S 7/04 340/438 |
| 2016/0107645 A1* | 4/2016 | Okuda | B60W 30/12 701/41 |
| 2016/0185388 A1* | 6/2016 | Sim | B62D 15/0255 701/41 |

\* cited by examiner

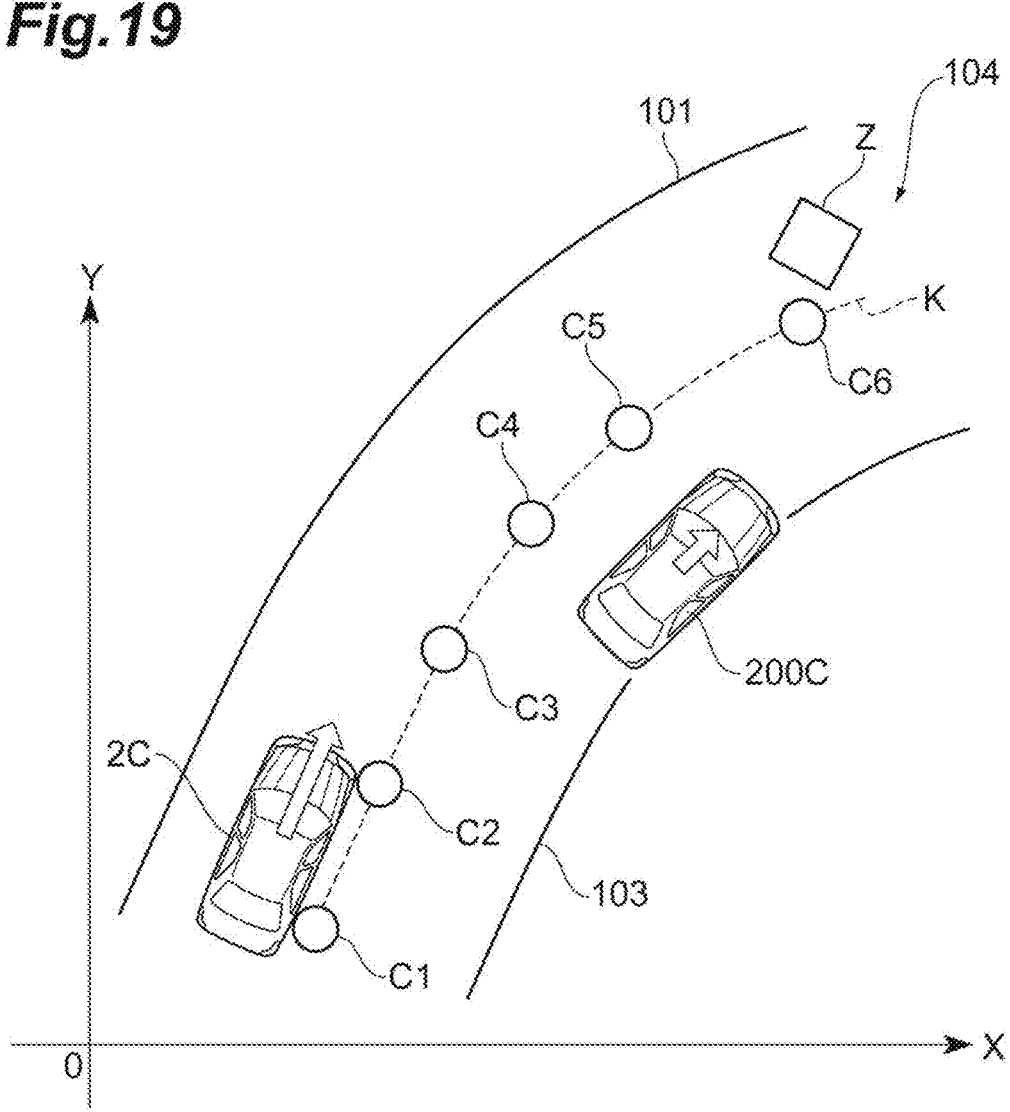

TRAVEL CONTROL APPARATUS

CROSS-REFERENCE TO RELATED APPLICATION

This application is based on Japanese Patent Application No. 2016-034141 filed with Japan Patent Office on Feb. 25, 2016, the entire contents of which are hereby incorporated by reference.

TECHNICAL FIELD

The present disclosure relates to a travel control apparatus.

BACKGROUND

In Japanese Patent No. 4211794, an apparatus configured to generate a travel trajectory avoiding a contact with an object around the vehicle is disclosed. The apparatus sequentially moves each position of the vehicle and the object around the vehicle in micro-step (for example, 0.1 to 0.5 second), and calculates a degree of interference between the vehicle and the object for each micro-step. The apparatus determines the travel trajectory of the vehicle based on a result of evaluation.

SUMMARY

The apparatus disclosed in Japanese Patent No. 4211794, however, needs to sequentially moves each position of the vehicle and the object around the vehicle in micro-step in order to calculate the future degree of interference. Therefore, the apparatus disclosed in Japanese Patent No. 4211794 may enormously increase an amount of calculation for deriving a travel trajectory avoiding the contact with the object around the vehicle.

In this technical field, it is desirable to reduce the amount of calculation for deriving a travel trajectory avoiding the contact with the object around the vehicle.

A travel control apparatus in an aspect of the present invention includes: a lane position recognition unit configured to recognize positions of lane boundary lines of a lane in which a vehicle travels in front of a vehicle in a plane coordinate system; a travelling position recognition unit configured to recognize a travelling position of the vehicle in the lane in the plane coordinate system; an object position recognition unit configured to recognize a position of an object present around the vehicle in the plane coordinate system; a transformation unit configured to project the lane boundary lines and the object recognized in the plane coordinate system on a lane coordinate system in which a center line of the lane is a first coordinate axis and an axis orthogonal to the first coordinate axis is a second coordinate axis by performing a coordinate transformation; an area calculation unit configured to calculate a travelable area in which the vehicle can travel in the lane coordinate system based on the lane boundary lines and the object in the lane coordinate system; a travel trajectory generation unit configured to generate a travel trajectory of the vehicle in the plane coordinate system based on the travelable area and the travelling position; and a control unit configured to perform a steering control on the vehicle based on the travel trajectory.

In this travel control apparatus, the lane boundary line and object around the vehicle are transformed to the lane coordinate system in which the lane center line is the first coordinate axis and the axis orthogonal to the first coordinate axis is the second coordinate axis, by the transformation unit. Generally, the vehicle moves relative to the center line of the lane rather than moving independent of the center line of the lane. The travel control apparatus can express only the relative movement of the vehicle and the object with respect to the center line of the lane by projecting the lane boundary lines and the object in the lane coordinate system. In the lane coordinate system, the movement of the vehicle and the object is simplified compared to the two-axis orthogonal coordinate system before the transformation. Therefore, the travel control apparatus can realize verification of the contact between the vehicle and the object in the lane coordinate system using a simple equation. Accordingly, the travel control apparatus can calculate the travelable area in which the vehicle can travel with a small amount of calculation compared to a case of performing an interference determination by sequentially moving the positions of each of the vehicle and the object in micro-step. Therefore, the travel control apparatus can reduce the amount of calculation for deriving the travel trajectory avoiding the contact with the object around the vehicle.

The travel control apparatus may further includes: a vehicle speed detection unit configured to detect a speed of the vehicle; an object speed detection unit configured to detect a speed of the object; and a position correction unit configured to correct the position of the object in the lane coordinate system projected by the transformation unit to a temporal position which is a position of the object in the lane coordinate system at a time when the vehicle overtakes the object, based on the position and speed of the object in the lane coordinate system and the travelling position and speed of the vehicle in the lane coordinate system. The area calculation unit may be configured to calculate the travelable area based on the temporal position of the object.

In a case of this configuration, the position of the object in the lane coordinate system is corrected to the position of the object in the lane coordinate system at the time when the vehicle overtakes the object (the position is temporal position). Therefore, the travel control apparatus can treat the moving object in the coordinate system before the transformation as a stationary object in the lane coordinate system at the time when the vehicle overtakes the object. Accordingly, the travel control apparatus can easily determine the position avoiding the object even when the environment around the vehicle changes with an elapse of the time due to the movement of the object.

The travel control apparatus may further include a narrow area determination unit configured to determine whether or not the travelable area calculated based on the temporal position of the object includes a narrow area in which a width in the second coordinate axis direction is equal to or smaller than a width threshold value. The area calculation unit may be configured to calculate the travelable area again while excluding the object when the narrow area determination unit determines that the travelable area includes the narrow area. The control unit may be configured to perform a speed control to follow the excluded object.

In a case where the object is treated as the stationary object, for example, even when the object is another vehicle changing the lane to the front direction of the vehicle, the object is treated as the stationary object. Accordingly, when the coordinate transformation is performed at this lane change scene, another vehicle treated as stationary in the lane coordinate system closes the lane in front of the vehicle. In this case, the travelable area for the vehicle becomes extremely narrow toward the travelling direction or may be cut off in the middle of the road. Therefore, it is not possible to generate the travel trajectory. When the object is treated as a stationary object in the lane coordinate system and when the travelable area includes the narrow area in the lane coordinate system, the travel control apparatus does not treat the object as the stationary object but treats as a preceding vehicle to be followed by the vehicle. Therefore, the travel control apparatus calculates the travelable area again in the lane coordinate system while excluding the object which is treated as the preceding vehicle. Therefore, even when the object such as another vehicle changing the lane in front of the vehicle is present, it is possible to calculate the travelable area in the lane coordinate system. Furthermore, the speed control is performed by the control unit with the excluded object as the followed object. Therefore, the travel control apparatus can surely avoid the contact of the vehicle and the object.

In the travel control apparatus, the position correction unit may be configured to perform processing to correct the position of the object in the lane coordinate system to the temporal position when positions and speeds of each of a plurality of objects are detected. The narrow area determination unit may determine whether or not the travelable area calculated based on the temporal positions of the plurality of objects includes the narrow area. The area calculation unit may be configured to calculate the travelable area again based on the remaining object after excluding the object having the highest speed among the plurality of objects forming the narrow area when the narrow area determination unit determines that the travelable area includes the narrow area. The control unit may be configured to perform the speed control to follow the excluded object having the highest speed.

When the object is treated as a stationary object in the lane coordinate system and when a plurality of objects is present and the lane in front of the vehicle is closed by the objects, the travel control apparatus treats the object having the highest speed as a preceding vehicle, and then, can calculate the travelable area again based on the position of the other remaining object. By selecting the preceding vehicle as described above, travel control apparatus can cause the vehicle to travel with a driving close to the general driving such as the driving with treating an object having the highest speed as a preceding vehicle while avoiding the collision with an object having a low speed.

According to various aspects of the present invention, it is possible to reduce the amount of calculation for deriving the travel trajectory avoiding the contact with the object around the vehicle.

BRIEF DESCRIPTION OF THE DRAWINGS

FIG. 19 is a diagram describing an example of lane boundary lines and positions of the objects in the plane coordinate system.

DETAILED DESCRIPTION

Hereinafter, embodiments of the present invention will be described in detail with reference to the drawings. In the description hereafter, the same reference signs will be given to the same or corresponding elements, and the descriptions thereof will not be repeated.

First Embodiment

Figure 1:
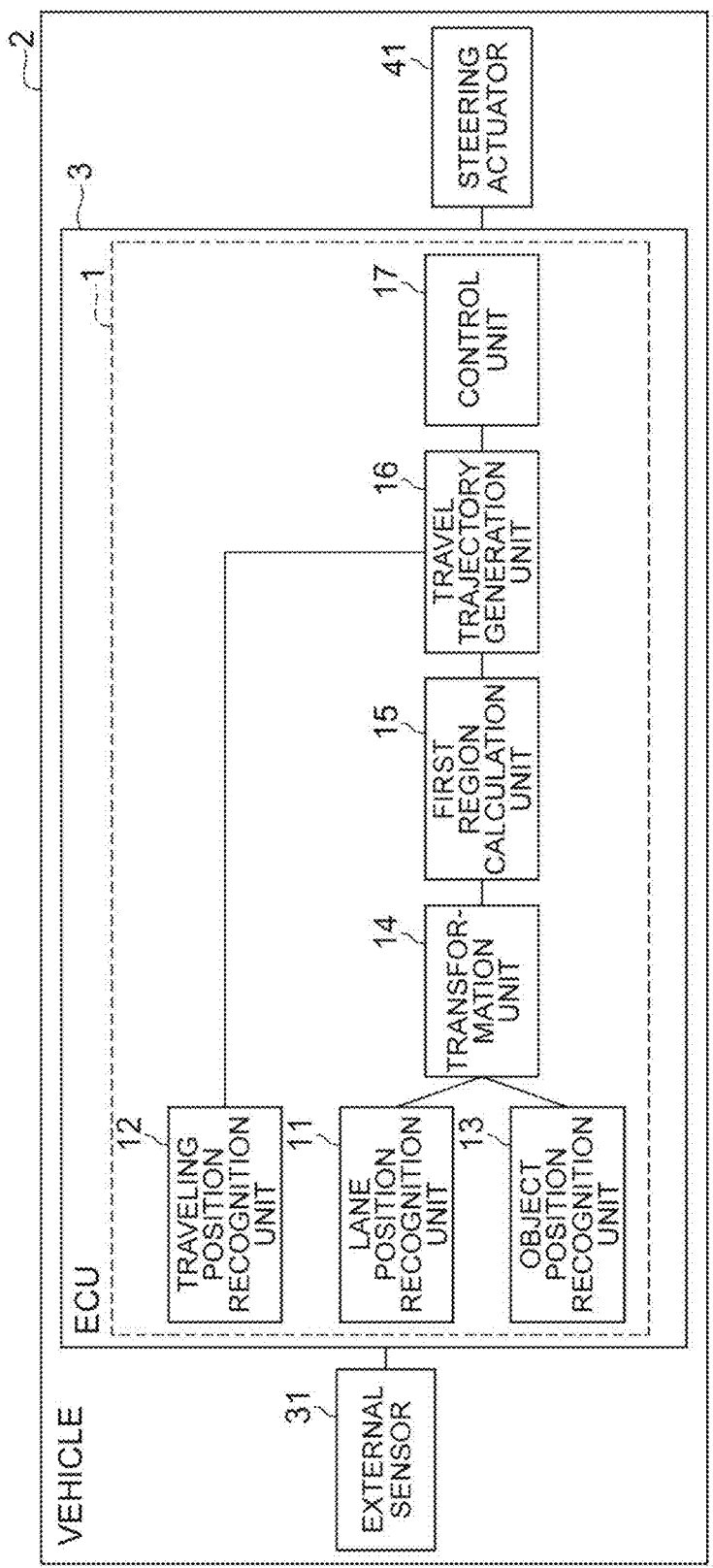
FIG. 1 is a block diagram describing a configuration of a vehicle including a travel control apparatus in a first embodiment.

FIG. 1 is a block diagram describing a configuration of a vehicle 2 including a travel control apparatus 1 in an embodiment. As illustrated in FIG. 1, the travel control apparatus 1 is mounted on the vehicle 2 such as a passenger car. The travel control apparatus 1 generates a target travel trajectory as described below. The travel control apparatus 1 performs a travel control of the vehicle 2 based on the target travel trajectory. In the first embodiment, the travel control means a steering control.

First, a basic principle of the travel control apparatus 1 will be described. The travel control apparatus 1 has a function of performing a coordinate transformation such that a position of an object and a position of lane boundary line indicated in the usual plane coordinate system are indicated on a coordinate system (lane coordinate system) different from the usual plane coordinate system, and a function of generating the target travel trajectory. The plane coordinate system is a coordinate system having two axes orthogonal to each other with the position of the vehicle 2 or a predetermined point other than the position of the vehicle 2 as an origin. The two axes orthogonal to each other are coordinate axes for expressing the positions on the plane on which the vehicle 2 travels. The plane coordinate system may be a coordinate system that is fixed to the vehicle 2 while the travelling direction of the vehicle 2 is Y axis and the lateral direction of the vehicle 2 is X axis, or may be a coordinate system in which the XY axes are fixed to a road. The lane coordinate system is a coordinate system associated with a shape of the lane. Specifically, the lane coordinate system is a coordinate system in which a center line of the lane is a first coordinate axis and an axis orthogonal to the first coordinate axis is a second coordinate axis.

Figure 2:
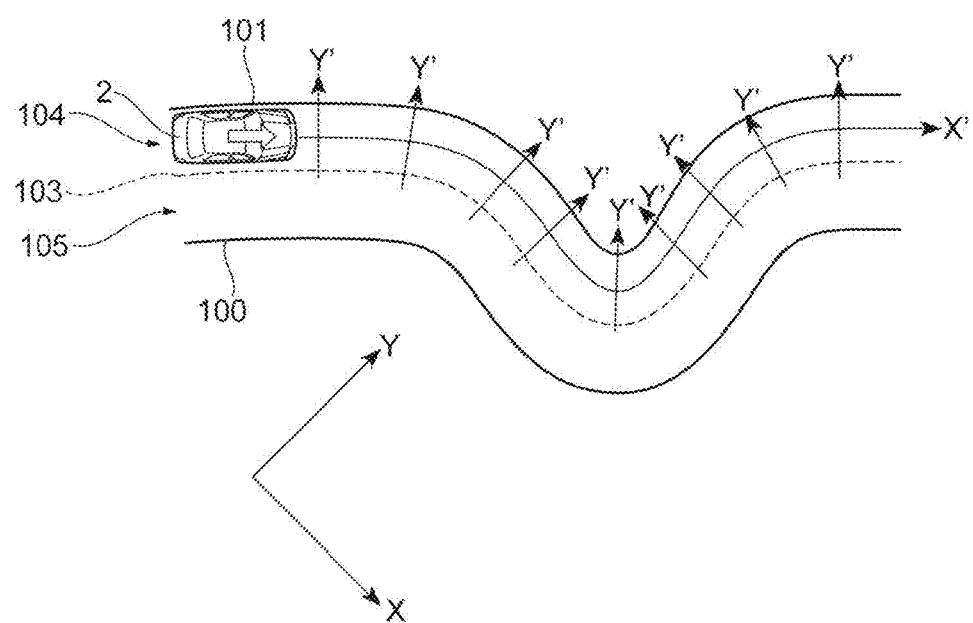
FIG. 2 is a diagram describing an example of a plane coordinate system and a lane coordinate system.

FIG. 2 is a diagram describing an example of the plane coordinate system and the lane coordinate system. In FIG. 2, a plane coordinate system fixed to the road having XY axes is illustrated as an example of the plane coordinate system. Hereinafter, the plane coordinate system will be referred to as an XY plane coordinate system. The vehicle 2 travels on a road demarcated by a lane boundary line 100 and a lane boundary line 101. The road has two lanes of lane 104 demarcated by the lane boundary line 101 and a lane boundary line 103, and a lane 105 demarcated by the lane boundary line 100 and a lane boundary line 103. The lane boundary line is a line that demarcates the lane. The vehicle 2 travels in the lane 104. In the lane coordinate system, a direction along a center point line of the lane 104 is a first coordinate axis X' and an axis orthogonal to the first coordinate axis X' is a second coordinate axis Y'. The travel control apparatus 1 projects the lane boundary lines 101 and 103 and a detected object to the lane coordinate system, and then, expresses only the relative movement of the vehicle 2 and the object with respect to the center line of the lane 104 as described below. In the lane coordinate system, the movement of the vehicle 2 and object is simplified compared to that in the two axes orthogonal coordinate system before the coordinate transformation.

The vehicle 2 includes an electronic control unit (ECU) 3, an external sensor 31, and a steering actuator 41. The ECU 3 is an electronic control unit including a central processing unit (CPU), read only memory (ROM), random access memory (RAM), and the like. The ECU 3 may be configured with a plurality of ECUs. The ECU 3 is connected to the external sensor 31 and the steering actuator 41 via a network that communicates using a controller area network (CAN) communication circuit, and performs a mutual communication.

The external sensor 31 is a detection device that detects a situation around the vehicle 2. The external sensor 31 includes a camera, radar, and a laser imaging detection and ranging (LIDAR).

The camera images the external situation of the vehicle 2. The camera is, for example, provided on the inside of windshield of the vehicle 2. The camera transmits image information relating to the external situation of the vehicle 2 to the ECU 3 as a result of detection. Environments on the road such as the lane boundary lines 100 to 103 and information on the object can be included in the image information from the camera. The objects are stationary objects such as a wall, a falling object, or the like on the road, and moving objects such as a pedestrian or another vehicle. The camera may be a monocular camera or may be a stereo camera. The stereo camera has two imaging units that are arranged so as to reproduce a binocular parallax. The image information from the stereo camera includes information in the depth direction.

The radar detects the objects around the vehicle 2 and the environments on the road such as the lane boundary lines 100 to 103 using a radio wave (for example, a millimeter wave). The radar measures a distance to a reflection point (detection point) by transmitting the radio wave to the surroundings of the vehicle 2 and receiving the wave reflected from the object, and then, detects the obstacle and the environment on the road. The radar transmits the result of detection to the ECU 3.

The LIDAR detects the object around the vehicle 2 and the environment on the road such as the lane boundary lines 100 to 103 using light. The LIDAR measures the distance to the reflection point (detection point) by transmitting the radio wave to the surroundings of the vehicle 2 and receiving the wave reflected from the object, and then, detects the obstacle and the environment on the road. The LIDAR transmits the result of detection to the ECU 3.

The ECU 3 is hardware that configures the travel control apparatus 1, and includes a lane position recognition unit 11, a travelling position recognition unit 12, an object position recognition unit 13, a transformation unit 14, a first area calculation unit (area calculation unit) 15, a travel trajectory generation unit 16 and a control unit 17 as the functions. That is, the travel control apparatus 1 includes the lane position recognition unit 11, the travelling position recognition unit 12, the object position recognition unit 13, the transformation unit 14, the first area calculation unit 15, the travel trajectory generation unit 16 and the control unit 17.

The lane position recognition unit 11 recognizes positions of the lane boundary lines 101 and 103 in front of the vehicle on the lane 104 in which the vehicle 2 travels, in the XY plane coordinate system. The front direction of the vehicle 2 means the travelling direction of the vehicle 2. Recognizing the position means acquiring the coordinate position. In a case of the coordinate system in which the XY axes are fixed to the road, the position (the longitude and the altitude) of the vehicle 2 is needed for recognizing the position of the lane boundary line in that coordinate system. The position of the vehicle 2 described above can be acquired using a known method such as a global positioning system (GPS) as will be described below.

The lane position recognition unit 11 recognizes the positions of the lane boundary lines 101 and 103 based on the result of detection using the external sensor 31. As a specific example, the lane position recognition unit 11 recognizes the positions of the lane boundary lines 101 and 103 on the XY plane using a function (so-called a sensor fusion function) of combining the image information from the camera, the object information from the radar, and the object information from the LIDAR. The lane position recognition unit 11 may acquire the coordinate positions of the entire of the detection points detected as the lane boundary lines 101 and 103, or may sample a representative point.

Figure 3:
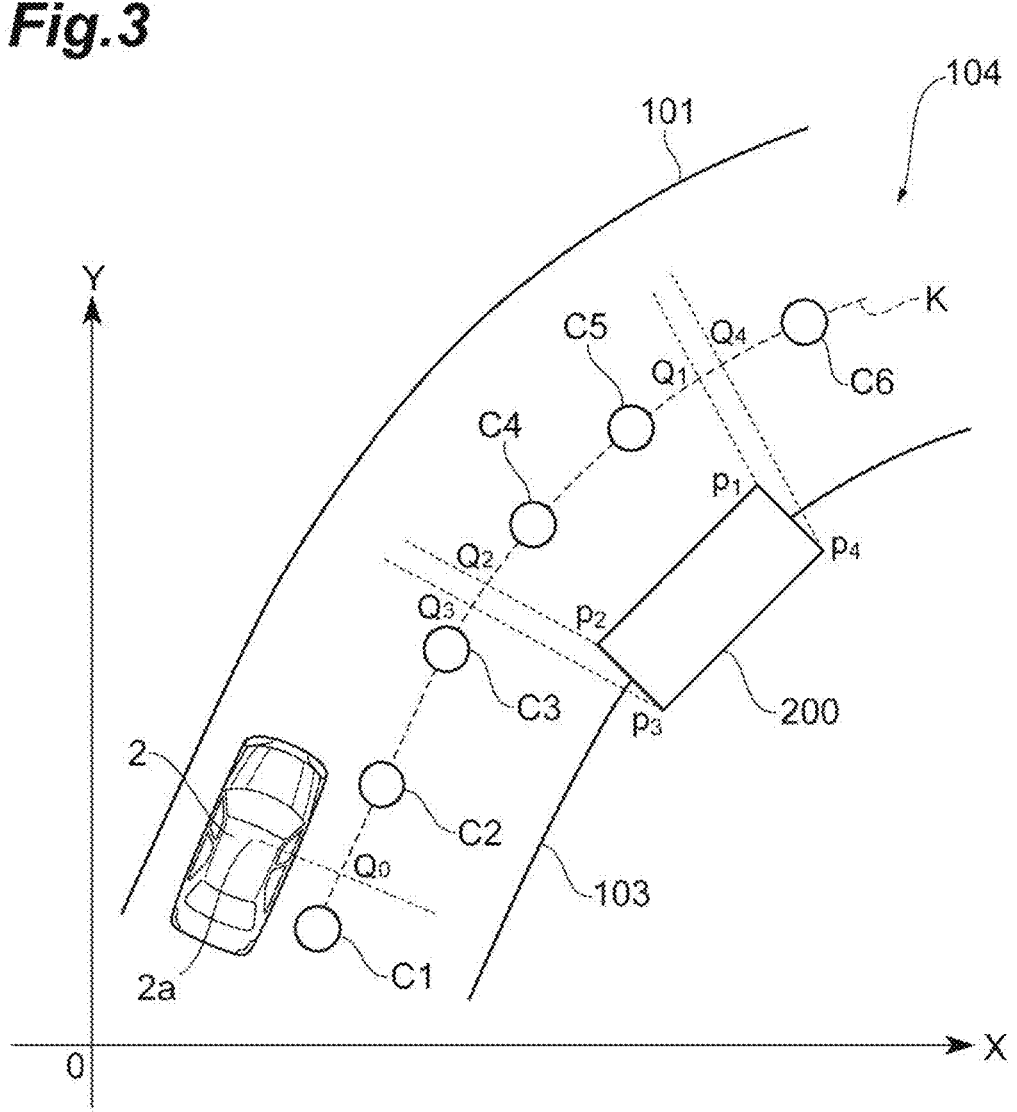
FIG. 3 is a diagram describing an example of a position of a lane boundary line and a position of the object in the plane coordinate system.

FIG. 3 is a diagram describing an example of the positions of the lane boundary lines 101 and 103 and the position of the object in the XY plane coordinate system. In FIG. 3, the description will be made under a consumption that the XY axes are fixed to the road. As illustrated in FIG. 3, the, lane position recognition unit 11 can recognize the positions of the lane boundary lines 101 and 103 on the XY plane and illustrate the results on the XY plane. The lane position recognition unit 11 also recognizes a position of a lane center line K, a lane width, a curvature (a shape of the lane) by recognizing the positions of the lane boundary lines 101 and 103. The lane center line K is a virtual line passing through center points (points C1 to C6 in FIG. 3) in the lane width direction. The lane position recognition unit 11 can recognize the lane center line K as a line in which the center points C1 to C6 in the lane width direction are discretely aligned in the travelling direction of the vehicle 2.

The travelling position recognition unit 12 recognizes the travelling position of the vehicle 2 on the lane 104 in which the vehicle 2 travels, in the XY plane coordinate system. Recognizing the travelling position means acquiring the coordinate position. The travelling position means a lateral position of the vehicle 2 on the lane. As illustrated in FIG. 3, as an example, the travelling position is a center of gravity position 2a of the vehicle 2 with the lane center line K as a reference. When the XY plane coordinate system is the coordinate system fixed to the vehicle 2, the travelling position recognition unit 12 recognizes the travelling position of the vehicle 2 on the lane based on the result of detection by the external sensor 31 similar to the case of the lane position recognition unit 11. When the XY plane coordinate system is the coordinate system fixed to the road, the travelling position recognition unit 12 recognizes the travelling position of the vehicle 2 on the lane using the known method such as the GPS.

The object position recognition unit 13 recognizes the position of the object being present around the vehicle 2 in the XY plane coordinate system. The object position recognition unit 13 recognizes the position of the object based on the result of detection by the external sensor 31. That is, positions around the vehicle 2 are detection ranges of the external sensor 31. A specific example of the position around the vehicle 2 is up to approximately several kilometers from the vehicle 2 as a start point. Recognizing a position is acquiring a coordinate position. The object position recognition unit 13 may acquire the coordinate position of all the detection points detected as the objects, or may sample a representative point. In FIG. 3, an object 200 is detected in the front right side of the vehicle 2 by the external sensor 31. As Illustrated in FIG. 3, the object position recognition unit 13 acquires the positions of end points $p_1$ to $p_4$ of the object 200 as representative points of the position of the object 200. A plurality of coordinate positions in the end points $p_1$ to $p_4$ in the object 200 expresses a shape the object 200 in the XY plane coordinate system.

The transformation unit 14 projects the lane boundary lines 101 and 103 and the object 200 recognized in the XY plane coordinate system on the lane coordinate system by performing the coordinate transformation. As illustrated in FIG. 3, the transformation unit 14 defines intersection points $Q_1$ to $Q_4$ by drawing orthogonal lines from the end points $p_1$ to $p_4$ of the object 200 to the lane center line K respectively. The transformation unit 14 defines an intersection point $Q_0$ by drawing an orthogonal line from the center of gravity position 2a of the vehicle 2 to the lane center line K. The transformation unit 14 calculates distances on the way of $L_1$ to $L_4$ from the intersection point $Q_0$ to the intersection point $Q_1$ to $Q_4$ respectively on the lane center line K. The transformation unit 14 calculates the distances on the way of $L_1$ to $L_4$ using a curvature function. Alternately, the transformation unit 14 may calculate the distances under an assumption that the line between the intersection points is a straight line. The transformation unit 14 calculates each of distance $Of_1$ from the intersection point $Q_1$ to the end point $p_1$, distance $Of_2$ from intersection point $Q_2$ to the end point $p_2$, distance $Of_3$ from the intersection point $Q_3$ to the end point $p_3$ and distance $Of_4$ from the intersection point $Q_4$ to the end point $p_4$. As described above, the transformation unit 14 transforms the coordinate values of the end points $p_1$ to $p_4$ of the object 200 to each of the coordinate values $(L_1, Of_1), (L_2, Of_2), (L_3, Of_3), (L_4, Of_4)$.

Figure 4:
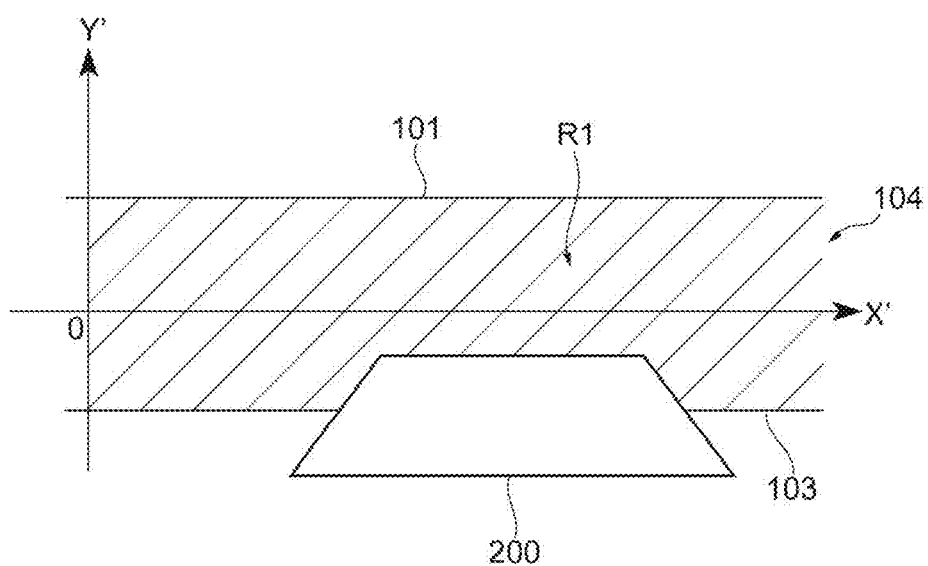
FIG. 4 is a diagram describing the lane boundary line, the object, and a travelable area indicated on the transformed lane coordinate system based on FIG. 3.

FIG. 4 is a diagram describing the lane boundary line 101 and 103, the object 200, and a first travelable area R1 indicated on the transformed lane coordinate system based on FIG. 3. As illustrated in FIG. 4, the lane coordinate system has a coordinate of an origin where the lateral position of the vehicle 2 is 0. A direction of a first coordinate axis X' is a direction of the lane direction extending along the center point line in the lane 104. A positive value means the front direction of the vehicle 2 and a negative value means the rear direction of the vehicle 2. A direction of a second coordinate axis Y' is a direction orthogonal to the first coordinate axis X', that is, the lane width. A positive value means the left side of the vehicle 2 and a negative value means the right side of the vehicle 2. Since the width of the lane 104 is a constant, the lane boundary line 101 has a constant positive value (a straight line parallel to the first coordinate axis X'). The lane boundary line 103 has a constant negative value (a straight line parallel to the first coordinate axis X'). In this case, in the lane coordinate system, the lane 104 has a belt shape demarcated on the lane boundary lines 101 and 103. The object 200 having a rectangle shape in the XY plane coordinate system becomes a trapezoid in the lane coordinate system. As described above, in the lane coordinate system, it is possible to transform the complicated road shape to a shape of a straight line or a combination of the straight lines.

The first area calculation unit 15 calculates the first travelable area based on the lane boundary lines 101 and 103 and the object 200 in the lane coordinate system. The first travelable area is an area where the vehicle 2 can travel in the lane coordinate system. The fact that the vehicle 2 can travel means that the vehicle 2 can travel without coming in contact with the object. The first area calculation unit 15 evaluates a risk in front of the host vehicle and calculates the first travelable area according to the risk. When the object 200 is a stationary object, the first area calculation unit 15 calculates an area where the vehicle 2 does not pass the object 200 as the travelable area. When the object 200 is a moving object, the first area calculation unit 15 calculates an area where the vehicle 2 does not pass the moving object 200 as the travelable area. As illustrated in FIG. 4, the first area calculation unit 15 calculates the first travelable area R1 by excluding the shape of the object 200 from the area surrounded by the lane boundary lines 101 and 103 (that is, the lane 104). The first area calculation unit 15 may provide with a predetermined portion of a margin inside of the lane from the lane boundary lines 101 and 103, or may provide with a predetermined portion of a margin from the outer edge of the object 200.

Figure 5:
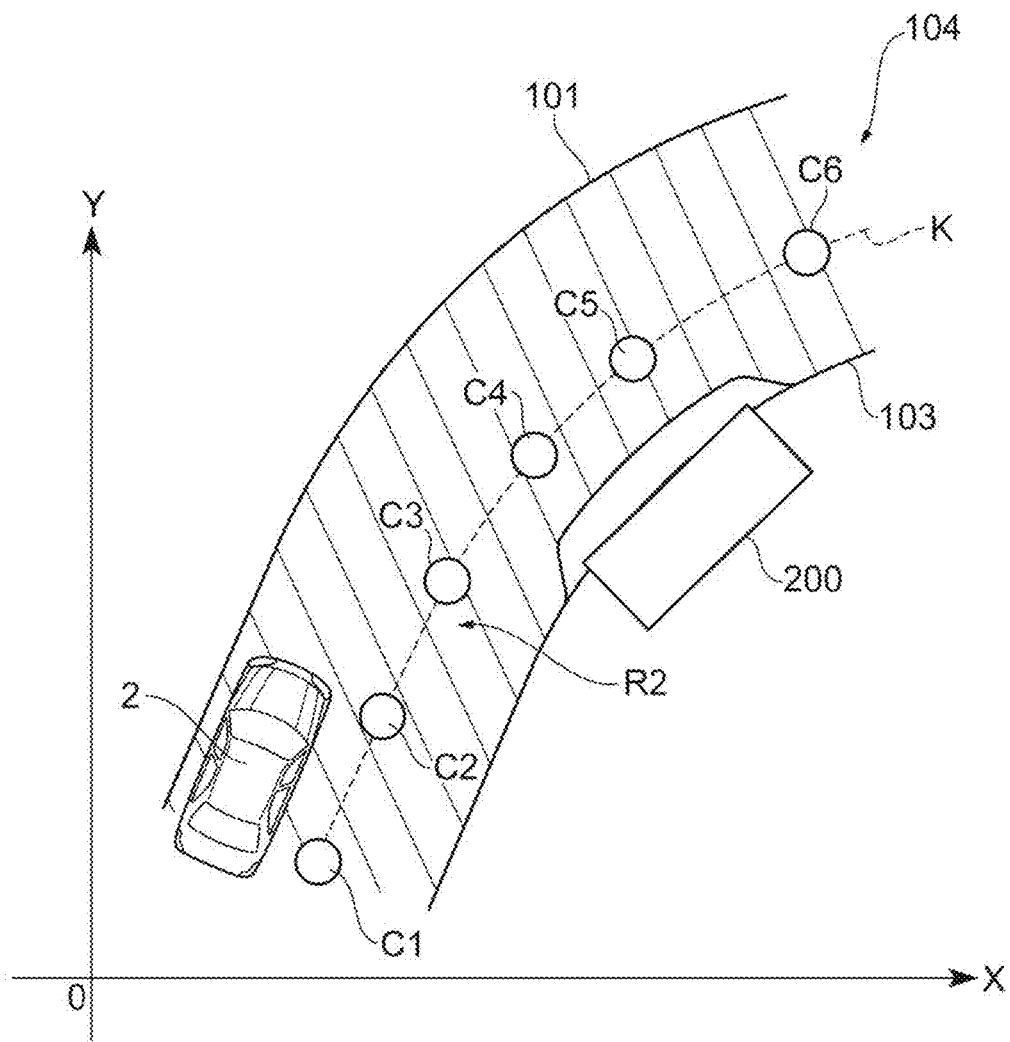
FIG. 5 is a diagram describing the travelable area in FIG. 3.

The travel trajectory generation unit 16 generates a travel trajectory of the vehicle 2 in the XY plane coordinate system based on the first travelable area R1 and the travelling position of the vehicle 2. Initially, the travel trajectory generation unit 16 inversely transforms the first travelable area R1 in the lane coordinate system to that in the XY plane coordinate system, and then, generates a second travelable area. FIG. 5 is a diagram describing the travelable area in FIG. 3. As illustrated in FIG. 5, the first travelable area R1 described in FIG. 4 is inversely transformed, and then, the second travelable area R2 is generated. The inverse transformation is performed by moving the coordinate point $(L_i, Of_i)$ to the orthogonal direction from the intersection point $Q_i$ as much as $Of_i$. As described above, the travel trajectory generation unit 16 generates the first travelable area R1 in the lane coordinate system in which the movement of the vehicle 2 is simply expressed, and then, performs the inverse transformation. Then, even in the complicated road shape, it is possible to calculate the second travelable area R2 with a small amount of calculation, which is the travelable area in the XY plane coordinate system. The travel trajectory generation unit 16 generates the travel trajectory in the second travelable area R2 with the travelling position of the vehicle 2 as a starting point. The travel trajectory generation unit 16 generates one travel trajectory in the second travelable area R2 while evaluating, for example, the speed, passing time, a ride comfort, or a fuel consumption.

The control unit 17 performs the steering control of the vehicle 2 based on the travel trajectory. The steering control includes an automatic steering for automatically controlling the steering of the vehicle 2 such that the vehicle 2 automatically travels along a target travel trajectory and a steering assistance for performing a control in cooperation with the steering by the driver of the vehicle 2 such that the vehicle 2 automatically travels along a target travel trajectory. The control unit 17 generates a steering parameter such as a steering angle for travelling along the travel trajectory using a known method such as a front gaze model, and outputs a control signal to the steering actuator 41.

The steering actuator 41 controls the driving of an assist motor that controls a steering torque in the electric power steering system according to the control signal from the ECU 3. In this way, the steering actuator 41 controls the steering torque of the vehicle 2.

Figure 6:
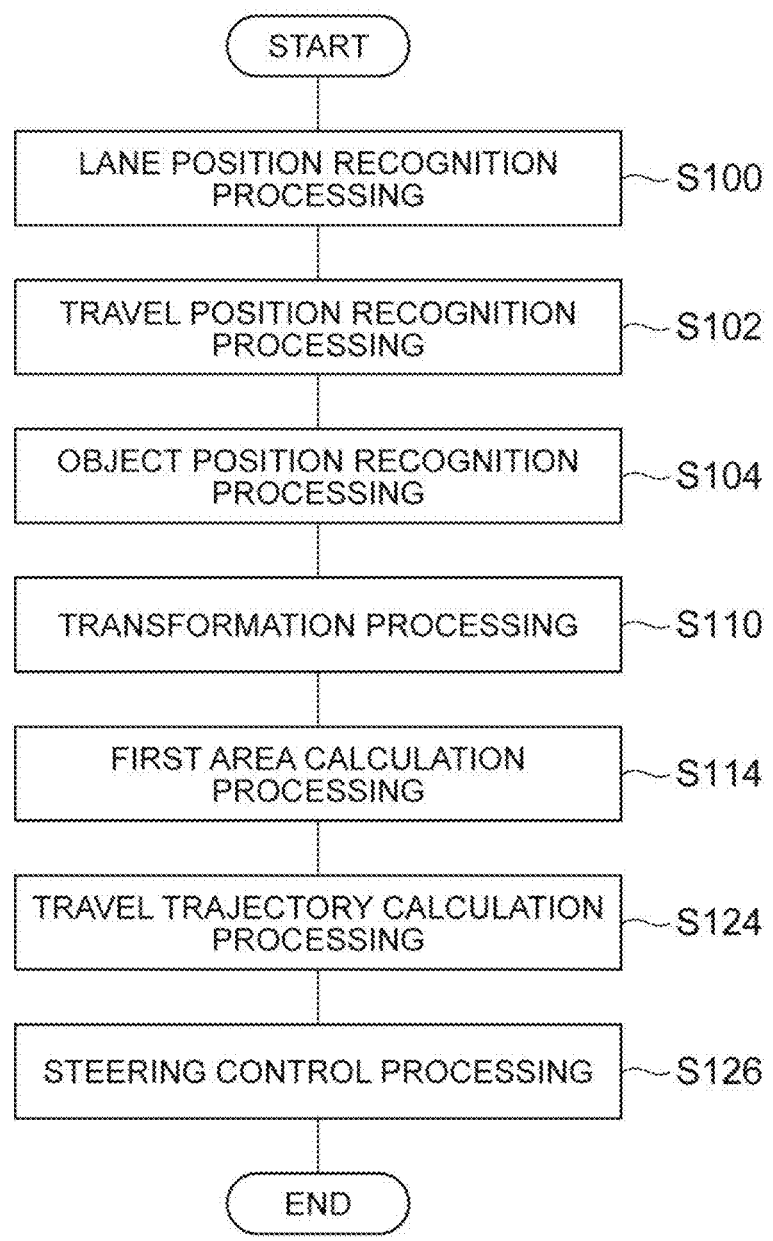
FIG. 6 is a flowchart illustrating travel control processing in the travel control apparatus in FIG. 1.

Next, the travel control processing in the travel control apparatus 1 will be described. FIG. 6 is a flowchart illustrating the travel control processing in the travel control apparatus 1 in FIG. 1. The travel control processing illustrated in FIG. 6 is started when a signal to start the operation of the travel control apparatus 1 is acquired.

As illustrated in FIG. 6, as lane position recognition processing (S100), the lane position recognition unit 11 of the travel control apparatus 1 recognizes the position of the lane boundary lines 101 and 103 in front of the vehicle travelling in the lane 104 in which the vehicle 2 travels, in the XY plane coordinate system. Next, as travel position recognition processing (S102), the travelling position recognition unit 12 of the travel control apparatus 1 recognizes the travelling position of the vehicle 2 in the lane 104 in which the vehicle 2 travels, in the XY plane coordinate system. Next, as object position recognition processing (S104), the object position recognition unit 13 of the travel control apparatus 1 recognizes the position of the object 200 being present around the vehicle 2, in the XY plane coordinate system. The order of the processing items from S100 to S104 may be appropriately interchanged.

Next, as transformation processing (S110), the transformation unit 14 of the travel control apparatus 1 projects the lane boundary lines 101 and 103 and the object 200 recognized in the XY plane coordinate system on the lane coordinate system by the coordinate transformation. Next, as first area calculation processing (S114), the first area calculation unit 15 of the travel control apparatus 1 calculates the first travelable area R1 based on the lane boundary lines 101 and 103 and the object 200 in the lane coordinate system. Next, as travel trajectory calculation processing (S124), the travel trajectory generation unit 16 of the travel control apparatus 1 generates the travel trajectory of the vehicle 2 in the XY plane coordinate system based on the first travelable area R1 and the travelling position of the vehicle 2. Then, as steering control processing (S126), the control unit 17 of the travel control apparatus 1 performs the steering control of the vehicle 2 based on the travel trajectory.

When the steering control processing (S126) ends, the travel control processing illustrated in FIG. 6 ends. In a case where the travel control processing ends, when a signal to end the operation of the travel control apparatus 1 is not acquired, the processing starts again from the lane position recognition processing (S100). As described above, the travel control processing illustrated in FIG. 6 is repeatedly executed until the signal to end the operation of the travel control apparatus 1 is acquired.

As described above, in the travel control apparatus 1 in the present embodiment, the lane boundary lines 101 and 103 and the object 200 around the vehicle are transformed to the lane coordinate system in which the lane center line K is the first coordinate axis X' and the axis orthogonal to the first coordinate axis X' is the second coordinate axis Y', by the transformation unit 14.

Figure 7A:
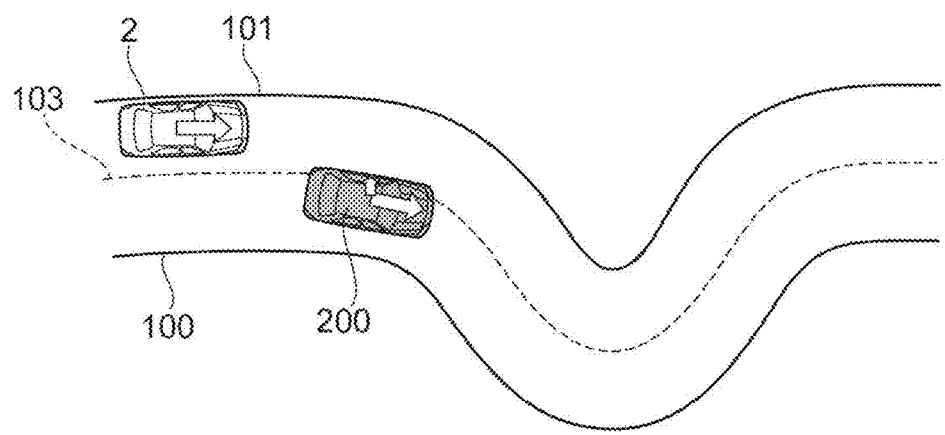
FIG. 7A and FIG. 7B are diagrams describing a contact determination performed in an XY plane coordinate system.
Figure 7B:
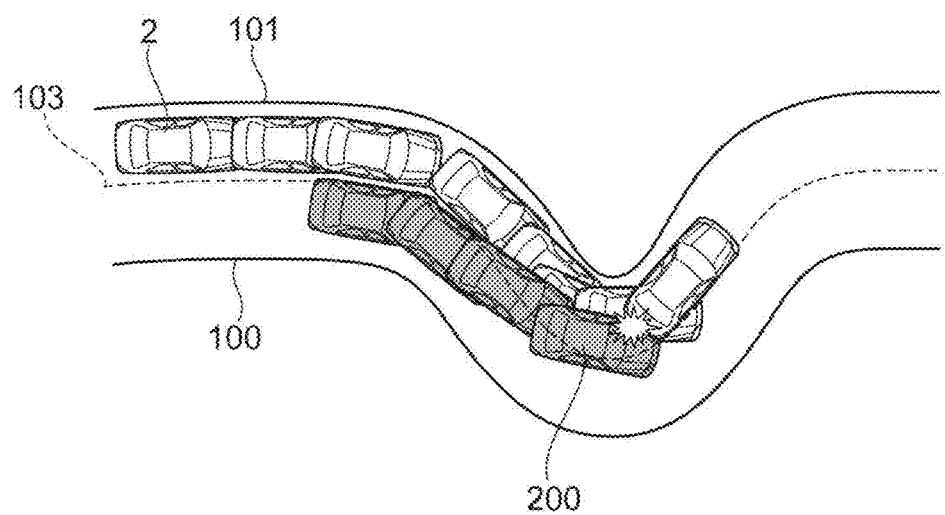

For comparison, a case of performing a contact determination in the XY plane coordinate system will be described. FIG. 7A and FIG. 7B are diagrams describing the contact determination performed in the XY plane coordinate system. FIG. 7A illustrates a scene in which the vehicle 2 and the object 200 are travelling on the road demarcated by the lane boundary lines 100 and 101. In this case, in order for the control device to perform the contact determination in the XY plane coordinate system, as illustrated in FIG. 7B, it is necessary to move the vehicle 2 and the object 200 in micro-steps, calculate travel trajectories of the vehicle 2 and the object 200 for each micro-step, and perform the contact determination for each micro-step. Therefore, there is a problem in that an amount of calculation of the contact determination enormously increases.

Figure 8A:
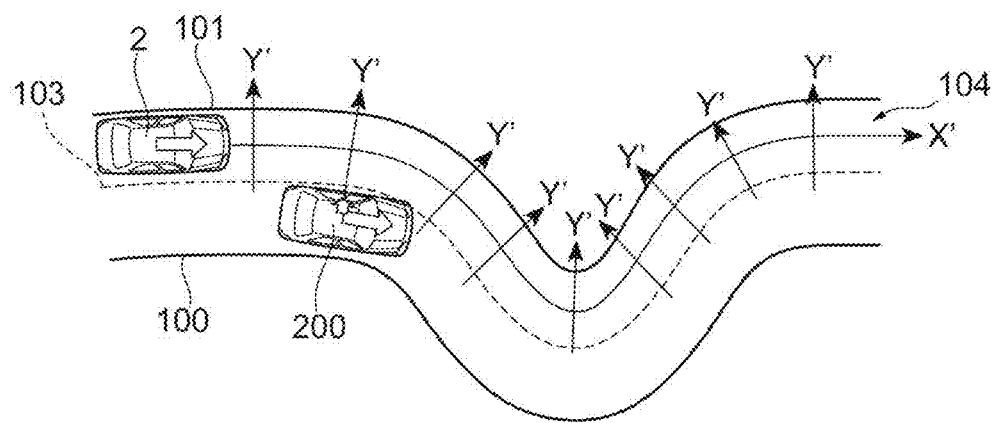
FIG. 8A and FIG. 8B are diagrams describing the contact determination by the travel control apparatus in the first embodiment.
Figure 8B:
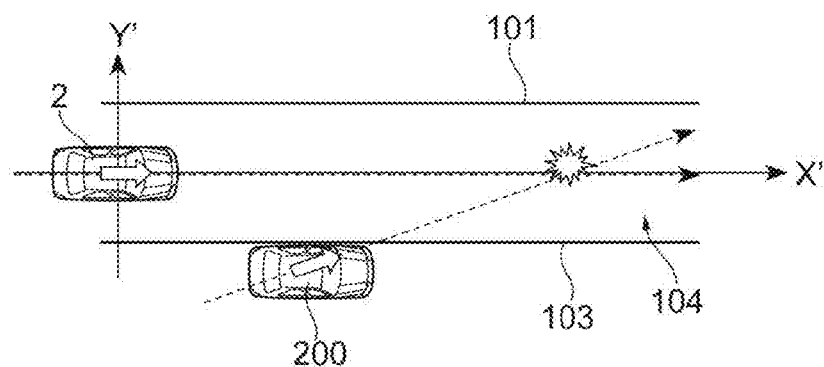

On the contrary, the contact determination by the travel control apparatus 1 will be described. FIG. 8A and FIG. 8B are diagrams describing the contact determination by the travel control apparatus 1 in the first embodiment. As illustrated in FIG. 8A, generally, the vehicle 2 relatively moves with respect to the lane center line K rather than non-relatively moving with respect to the lane center line K. As illustrated in FIG. 8B, the movements of the vehicle 2 and the object 200 are approximated to straight lines by projecting the lane boundary lines 101 and 103 and the object 200 on the lane coordinate system. As described above, the travel control apparatus 1 in the present embodiment can express only the relative movement of the vehicle 2 and the object 200 with respect to the lane center line K. Therefore, the relative movement can easily be expressed mathematically, and thus, a verification of interference can also be simply performed using a known method such as a TTC. Accordingly, the travel control apparatus 1 in the present embodiment can calculate the travelable area on which the vehicle 2 can travel with a small amount of calculation compared to the case of sequentially moving each of the positions of the vehicle 2 and the object 200 in micro-steps and performing the interference determination. Therefore, the travel control apparatus 1 in the present embodiment can reduce the amount of calculation for deriving a travel trajectory in which the vehicle 2 does not come in contact with the object 200 around the vehicle.

Second Embodiment

A travel control apparatus 1A in a second embodiment is different from the travel control apparatus 1 in the first embodiment in points that the travel control apparatus 1A includes a first area calculation unit 15A of which a data input destination is different from that of the first area calculation unit 15, and additionally includes a vehicle speed detection unit 18, an object speed detection unit 19 and a position correction unit 20. Hereinafter, the description regarding the configuration same as that in the travel control apparatus 1 in the first embodiment will be omitted, and a difference in the configuration will be mainly described.

First, a basic principle of the travel control apparatus 1A will be described. The travelable area calculated by the travel control apparatus 1 is the travelable area at the current time. That is, the travelable area is very useful in a situation that an environment around the vehicle 2 does not change during travelling (for example, when the object 200 is a stationary object). However, in a situation that an environment around the vehicle 2 changes during travelling, since the travelable area is calculated under the consumption that the travelling environment at the current time is unchanged, a calculation of a position avoiding the moving object is additionally required. The travel control apparatus 1A makes a situation that all the objects can be regarded as stationary by correcting the position of an object 200A in the lane coordinate system using the position and speed of the vehicle 2A and the position and speed of the object 200A, and then, calculates a travelable area.

Figure 9:
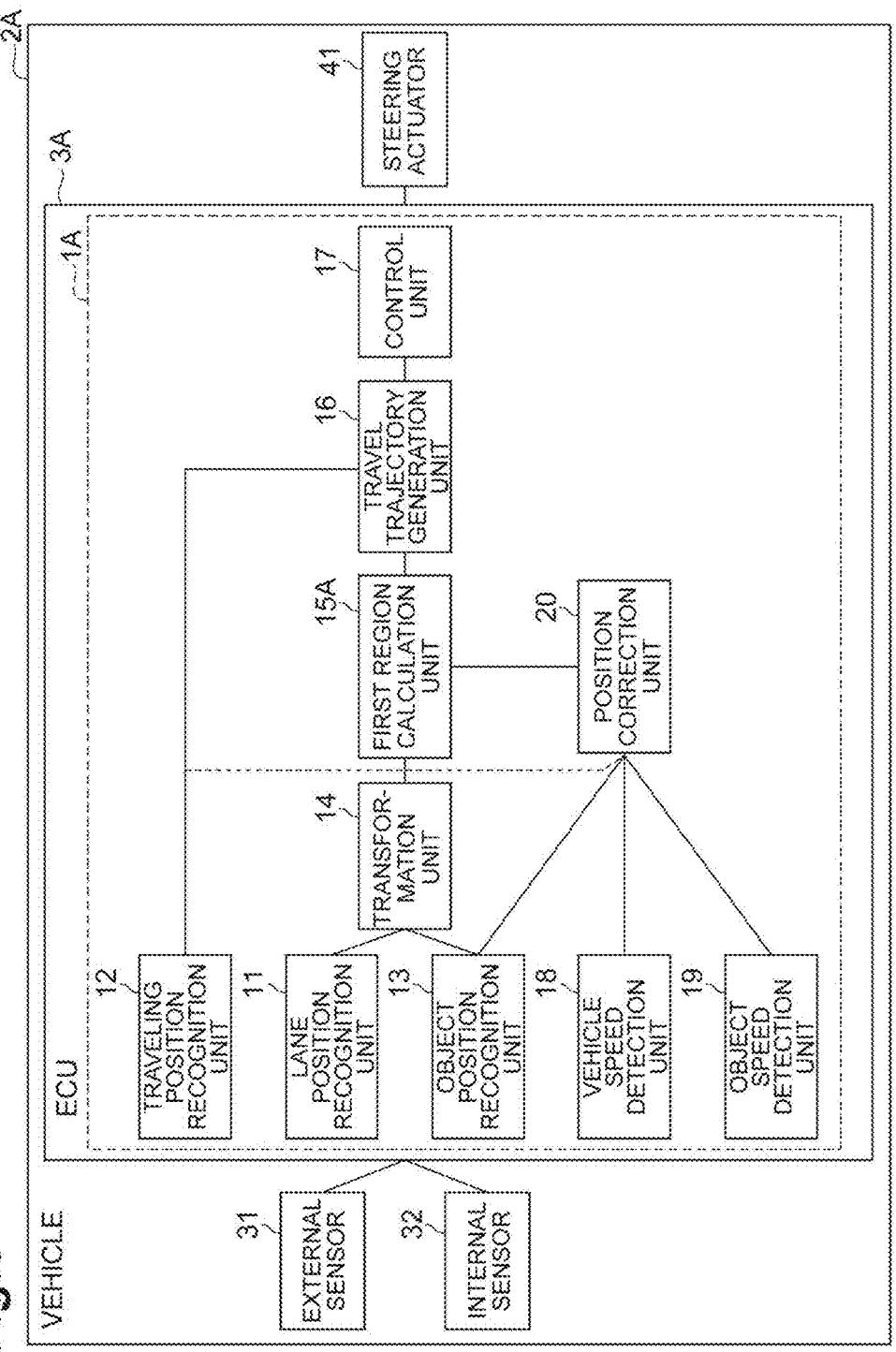
FIG. 9 is a block diagram describing a configuration of a vehicle including a travel control apparatus in a second embodiment.

FIG. 9 is a block diagram describing a configuration of a vehicle 2A including the travel control apparatus 1A in the second embodiment. The vehicle 2A includes an ECU 3A, an external sensor 31, an internal sensor 32 and the steering actuator 41. The ECU 3A is an electronic control unit including a central processing unit (CPU), read only memory (ROM), random access memory (RAM), and the like. The ECU 3A may be configured with a plurality of ECUs. The ECU 3A is connected to the external sensor 31, the internal sensor 32 and the steering actuator 41 via a network that communicates using a controller area network (CAN) communication circuit, and performs a mutual communication.

The internal sensor 32 is a detection device that detects the travelling state of the vehicle 2A. The internal sensor 32 includes a vehicle speed sensor. The vehicle speed sensor detects a speed of the vehicle 2. As the vehicle speed sensor, for example, a wheel speed sensor is used, which is provided on vehicle wheels of the vehicle 2A or on a drive shaft rotating integrally with vehicle wheels, and detects a rotational speed of the vehicle wheels. The vehicle speed sensor transmits the detected vehicle speed information to the ECU 3A.

The ECU 3A is hardware that configures the travel control apparatus 1A, and includes the lane position recognition unit 11, the travelling position recognition unit 12, the object position recognition unit 13, the transformation unit 14, the first area calculation unit (area calculation unit) 15A, the travel trajectory generation unit 16, the control unit 17, the vehicle speed detection unit 18, the object speed detection unit 19 and the position correction unit 20 as the functions. That is, the travel control apparatus 1A includes the lane position recognition unit 11, the travelling position recognition unit 12, the object position recognition unit 13, the transformation unit 14, the first area calculation unit 15A, the travel trajectory generation unit 16, the control unit 17, the vehicle speed detection unit 18, the object speed detection unit 19 and the position correction unit 20.

The vehicle speed detection unit 18 detects the speed of the vehicle 2. The vehicle speed detection unit 18 detects the speed of the vehicle 2 based on the vehicle speed information from the internal sensor 32.

The object speed detection unit 19 detects a speed of the object 200A. The object speed detection unit 19 calculates a relative speed with the vehicle 2A using a temporal change of the position of the object 200A based on the result of detection by the external sensor 31, and calculates the speed of the object 200A using the result of calculation and the speed of the vehicle 2.

Figure 10:
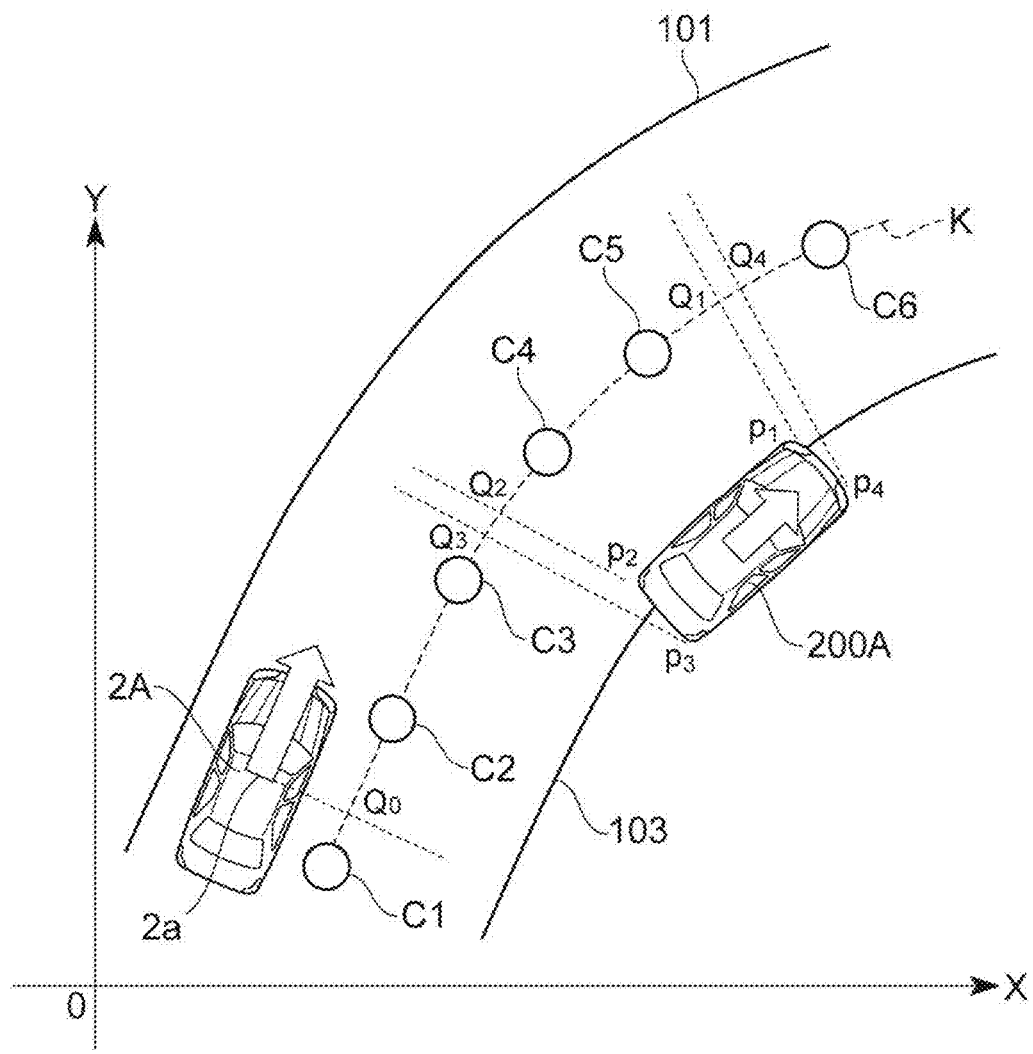
FIG. 10 is a diagram describing an example of a position of a lane boundary line and a position of the object in the plane coordinate system.
Figure 11A:
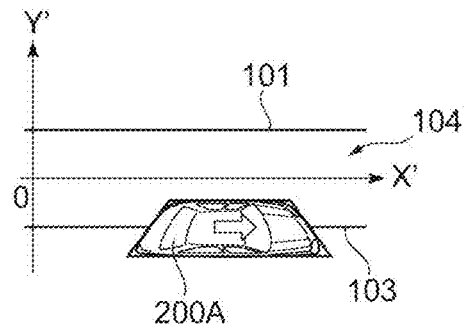
FIG. 11A to FIG. 11C are diagrams describing a correction of a temporal position of the object, and a travelable area indicated on the lane coordinate system transformed based on FIG. 10.
Figure 11B:
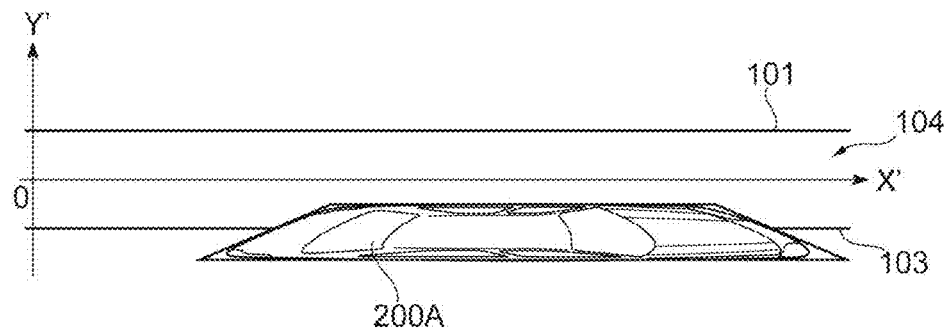
Figure 11C:
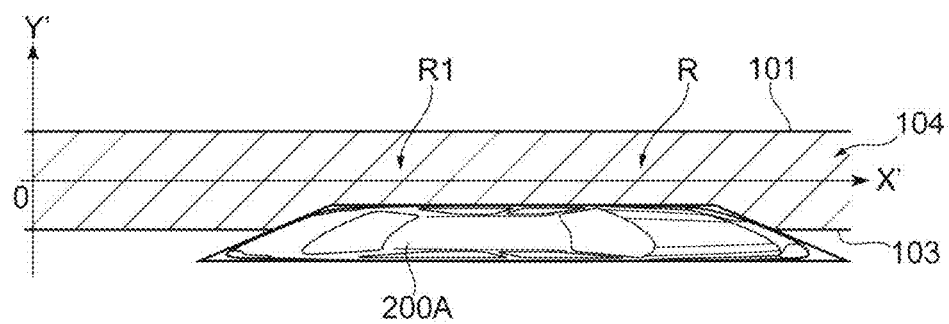

The position correction unit 20 corrects the position of the object 200A in the lane coordinate system projected by the transformation unit 14, based on the position and speed of the object 200A in the lane coordinate system and the travelling position and the speed of the vehicle 2A in the lane coordinate system. FIG. 10 is a diagram describing an example of the position of the lane boundary lines 101 and 103 and the position of the object 200A in the XY plane coordinate system. The object 200A illustrated in FIG. 10 is a moving object (another vehicle). The transformation unit 14 projects the lane boundary lines 101 and 103 and the object 200A on the lane coordinate system using the method same as the coordinate transformation in the first embodiment. FIG. 11A to FIG. 11C are diagrams describing a correction of a temporal position of the object 200A, and a travelable area indicated on the lane coordinate system transformed based on FIG. 10. As illustrated in FIG. 11A, the transformation unit 14 projects the lane boundary lines 101 and 103 and the object 200A on the lane coordinate system illustrated in FIG. 10.

The position correction unit 20 corrects the position of the object 200A which is a moving object after the projection. The position correction unit 20 corrects the position of the object 200A projected by the transformation unit 14 in the lane coordinate system to a temporal position which is the position of the object 200A in the lane coordinate system at the time when the vehicle 2A overtakes the object 200A. When an intersection point $Q_t$ is defined by drawing a orthogonal line from a front end portion of the vehicle 2A to the lane center line K and an intersection point $Q_p$ is defined by drawing a orthogonal line from a rear end portion of the object 200A to the lane center line K in FIG. 10 for example, the overtaking time may be defined as a time when the intersection point $Q_t$ is coincide with the intersection point $Q_p$ when the intersection point $Q_t$ is moved at the speed of the vehicle 2A and the intersection point $Q_p$ is moved at the speed of the object 200A. In FIG. 11A, a coordinate point of the object 200A before the correction is defined as $(L_i, Of_i)$ and a coordinate point of the object 200A after the correction is defined as $(L_i', Of_i')$. Hereinafter, the coordinate point after the correction derived by the position correction unit 20 is referred to as the temporal position. In addition, a speed component of object 200A in the direction of the first coordinate axis X' is defined as $V_{Lon\_target}$, a speed component of the object 200A in the direction of the second coordinate axis Y' is defined as $V_{Lat\_target}$, and a speed component of the vehicle 2A in the direction of the first coordinate axis X' is defined as $V_{Lon\_ego}$. In this case, the temporal position can be calculated using Equation (1) described below.

Equation (1)

$$L_i' = \frac{L_i}{V_{Lon\_ego} - V_{Lon\_target}} \cdot V_{Lon\_ego} \quad (1)$$

$$Of_i' = Of_i + \frac{L_i}{V_{Lon\_ego} - V_{Lon\_target}} \cdot V_{Lat\_target}$$

In this way, the time (reference time) when the vehicle 2A overtakes the object 200A is calculated using the relative speed between the vehicle 2A and the object 200A, and then, the temporal position is derived. $L_i'$ in the temporal position ($L_i'$, $Of_i'$) is an amount of movement of the vehicle 2A on the first coordinate axis X' from the current time to the reference time. $Of_i'$ is an amount of movement of the object 200A on the second coordinate axis Y' from the current time to the reference time. As described above, the temporal position can also be referred to as the position at the reference time. Equation (1) can be expressed in a matrix form as shown in Equation (2).

Equation (2)

$$\begin{bmatrix} L_i' \\ Of_i' \end{bmatrix} = \begin{bmatrix} L_i \\ Of_i \end{bmatrix} \begin{bmatrix} \frac{V_{Lon\_ego}}{V_{Lon\_ego} - V_{Lon\_target}} & 0 \\ \frac{V_{Lat\_target}}{V_{Lon\_ego} - V_{Lon\_target}} & 1 \end{bmatrix} \quad (2)$$

It is possible to perform the calculation at a high speed using this matrix form coordinate transformation equation even when the correction target is an object having a complicated shape. Due to the correction described above, the object 200A is stretched along the first coordinate axis X' as the relative speed decreases. This means that the traveling distance becomes long when the vehicle 2A overtakes the object 200A of which the relative speed is low. The position on the first coordinate axis X' indicates the situation at that position at the time when the vehicle 2A reaches that position. That is, a time element is included in the position on the first coordinate axis X'. When the vehicle 2A and the object 200A move at the same speed or when the vehicle 2A moves at a speed lower than that of the object 200A, that is, when the relative speed between the vehicle 2A and the object 200A becomes zero or negative, the vehicle 2A does not overtake the object 200A. Therefore, the coordinate point of the object 200A after the correction may be excluded.

FIG. 11B is an example in which the end points $p_1$ to $p_4$ of the object 200A are corrected. As illustrated in FIG. 11B, the object 200A is stretched along the first coordinate axis X' by the position correction unit 20. The first area calculation unit 15A can treat all the objects as being in the stationary state in the lane coordinate system illustrated in FIG. 11B. The first area calculation unit 15A calculates the first travelable area R1 based on the temporal position of the object 200A. Specifically, as illustrated in FIG. 11C, the first area calculation unit 15A generates the first travelable area R1 in which the vehicle 2 does not come in contact with the object 200A using the stretched object 200A and the lane 104.

Figure 12:
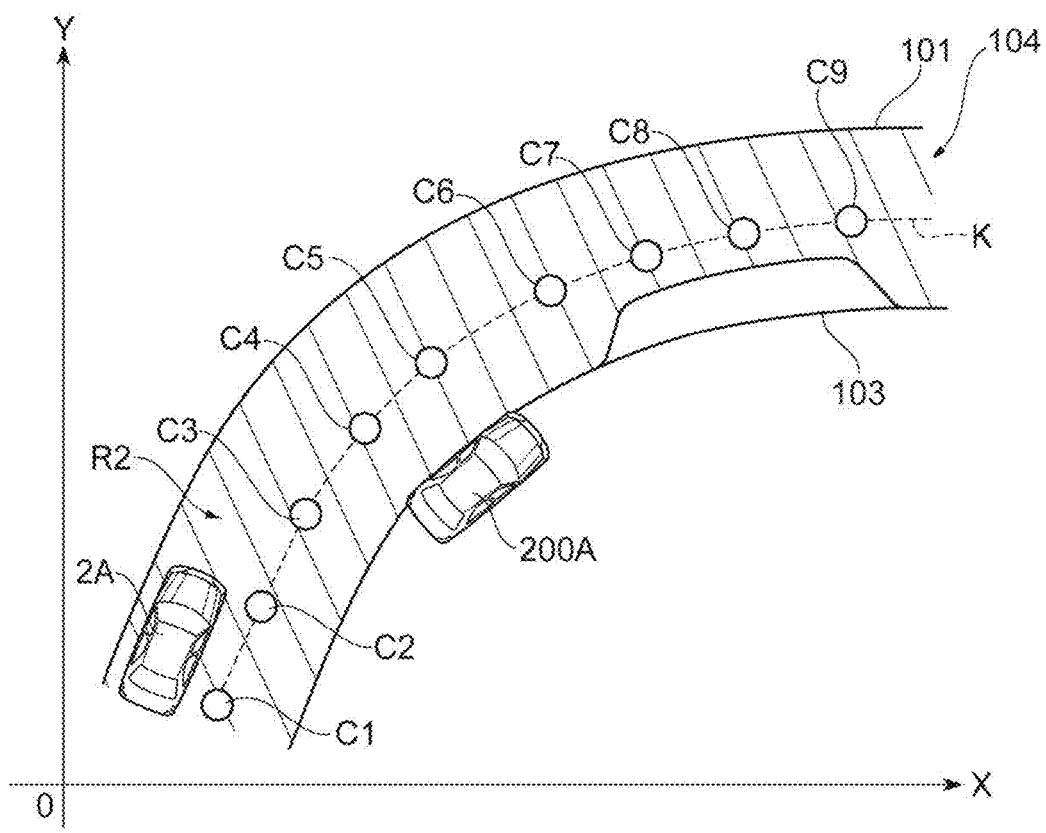
FIG. 12 is a diagram describing the travelable area in FIG. 10.

The travel trajectory generation unit 16 generates a travel trajectory of the vehicle 2A in the XY plane coordinate system based on the first travelable area R1 and the travelling position of the vehicle 2A. FIG. 12 is a diagram describing the travelable area in FIG. 10. As illustrated in FIG. 12, the second travelable area R2 is generated by performing an inverse transformation on the first travelable area R1 described in FIG. 11C. A point different from that in the first embodiment illustrated FIG. 5 is the point that the position avoiding the object 200A is moved to the front of the object 200A.

Other configurations of the travel control apparatus 1A are the same as those of the travel control apparatus 1.

Figure 13:
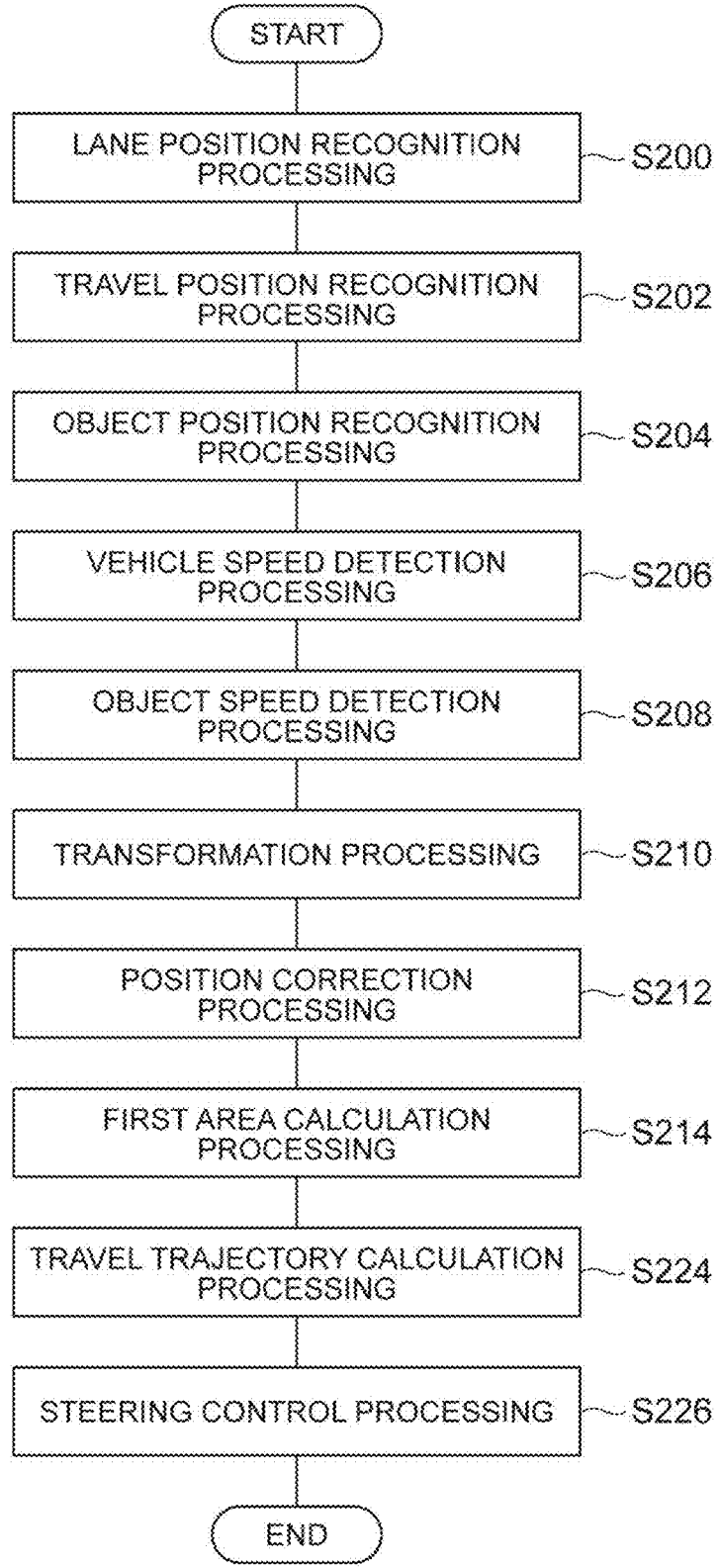
FIG. 13 is a flowchart illustrating travel control processing in the travel control apparatus in FIG. 9.

Next, travel control processing in the travel control apparatus 1A will be described. FIG. 13 is a flowchart illustrating the travel control processing in the travel control apparatus 1A in FIG. 9. The travel control processing illustrated in FIG. 13 is started when a signal to start the operation of the travel control apparatus 1A is acquired.

Lane position recognition processing (S200), travel position recognition processing (S202), object position recognition processing (S204) illustrated in FIG. 13 are the same as the lane position recognition processing (S100), the travel position recognition processing (S102), the object position recognition processing (S104) in the travel control apparatus 1.

As vehicle speed detection processing (S206), the vehicle speed detection unit 18 of the travel control apparatus 1A detects the speed of the vehicle 2A based on the vehicle speed information from the internal sensor 32.

Next, as object speed detection processing (S208), the object speed detection unit 19 of the travel control apparatus 1A calculates the relative speed with the vehicle 2 using the temporal change of the position of the object 200A based on the result of detection by the external sensor 31, and then, detects the speed of the object 200A using the result of calculation and the speed of the vehicle 2A.

Transformation processing (S210) in the travel control apparatus 1A is the same as the transformation processing (S110) in the travel control apparatus 1.

Next, as position correction processing (S212), the position correction unit 20 of the travel control apparatus 1A corrects the position of the object 200A projected in the lane coordinate system by the transformation unit 14, based on the position and speed of the object 200A in the lane coordinate system and the travelling position and speed of the vehicle 2A in the lane coordinate system.

Next, as first area calculation processing (S214), the first area calculation unit 15A of the travel control apparatus 1A calculates the first travelable area R1 based on the temporal position of the object 200A.

Travel trajectory calculation processing (S224) and steering control processing (S226) in the travel control apparatus 1A are the same the travel trajectory calculation processing (S124) and the steering control processing (S126) in the travel control apparatus 1.

When the steering control processing (S226) ends, the travel control processing illustrated in FIG. 13 ends. In a case where the travel control processing ends, when a signal to end the operation of the travel control apparatus 1A is not acquired, the processing starts again from the lane position recognition processing (S200). As described above, the travel control processing illustrated in FIG. 13 is repeatedly executed until the signal to end the operation of the travel control apparatus 1A is acquired.

A described above, the travel control apparatus 1A in the present embodiment achieves an effect same as that of the travel control apparatus 1. In addition, in the travel control apparatus 1A in the present embodiment, the position of the object 200A in the lane coordinate system is corrected to the position of the object (temporal position) in the lane coordinate system at the time when the vehicle 2 overtakes the object 200A. Therefore, the travel control apparatus 1A can treat the moving object in the coordinate system before the transformation as the stationary object at the time when the vehicle 2A overtakes the object 200A in the lane coordinate system. Accordingly, even when the environment around the vehicle changes with the elapse of the time due to the movement of the object 200A, the travel control apparatus 1A can easily determine the position avoiding the object 200A. In addition, when a plurality of moving objects is present around the vehicle 2A, an extremely complicated interference determination is required in the XY plane coordinate system. On the contrary, even when the plurality of moving objects is present around the vehicle 2A, the travel control apparatus 1A can treat all the objects as the stationary objects. Therefore, the effect of reducing the amount of calculation becomes particularly remarkable.

Figure 14A:
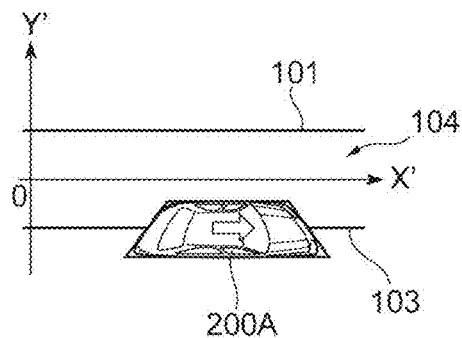
FIG. 14A to FIG. 14C are diagrams describing another example of the correction of the object to the temporal position in the lane coordinate system.
Figure 14B:
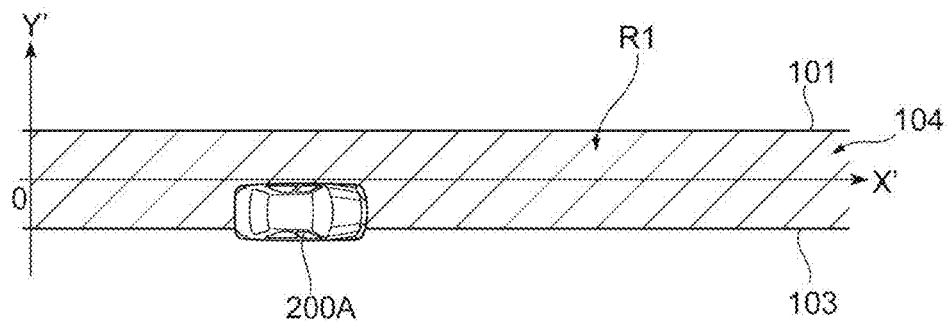
Figure 14C:
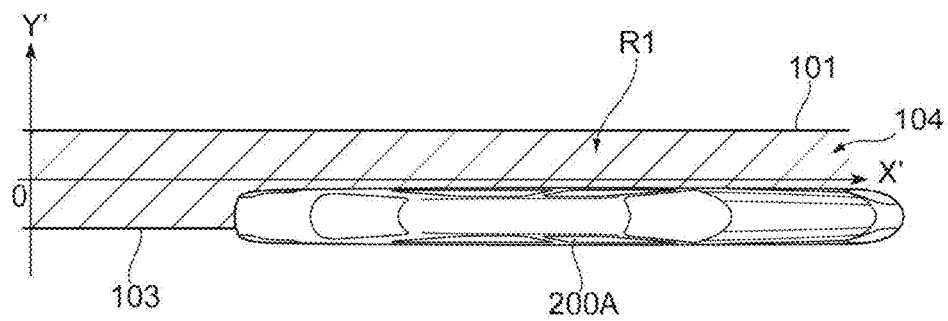

The position correction unit 20 may be configured to achieve the same effect by performing the correction using a method other than the method using Equations (1) and (2). When generating the travel trajectory, timing for starting the avoidance of the object 200A and the required amount of movement are important. Therefore, the position correction unit 20 may calculate only the timing for starting the avoidance of the object 200A. FIG. 14A to FIG. 14C are diagrams describing another example of the correction of the object to the temporal position in the lane coordinate system. When correcting the object 200A in the lane coordinate system as illustrated in FIG. 14A, the position correction unit 20 may correct only the position (for example, a position of the center of gravity) of the object 200A as illustrated in FIG. 14B. A physical quantity used in the correction in the above described case is based on the position and speed of the object 200A in the lane coordinate system and the travelling position and speed of the vehicle 2A in the lane coordinate system, similarly to Equation (1). Even when the correction is performed as described above, it is possible to obtain appropriate avoidance timing. In addition, as illustrated in FIG. 14C, the object 200A illustrated in FIG. 14B may be stretched at an appropriate magnification along the first coordinate axis X'.

Third Embodiment

A travel control apparatus 1B in a third embodiment is different from the travel control apparatus 1A in the second embodiment in points that the travel control apparatus 1B includes a first area calculation unit 15B of which the number of generations of the travelable areas is different from that of the first area calculation unit 15A and a control unit 17B in which a speed control function to the control unit 17, and additionally includes a narrow area determination unit 21. Hereinafter, the description regarding the configuration same as that in the travel control apparatus 1A in the second embodiment will be omitted, and a difference in the configuration will be mainly described.

First, a basic principle of the travel control apparatus 1B will be described. The travel control apparatus 1A can generate an appropriate travelable area in order to avoid an object 200A having a speed. However, when the moving object closes the lane in front of the vehicle 2A, it is not possible to define the travelable area. The travel control apparatus 1A cannot define the travelable area even when the travelable area is extremely narrow toward the travelling direction. Therefore, when the object 200B closes the lane in front of the vehicle 2B or when the travelable area is extremely narrow toward the travelling direction, the travel control apparatus 1B performs the speed control while treating the object 200B as a preceding vehicle. In this way, under the consumption that the vehicle 2 does not over take the object 200B, the travel control apparatus 1B generates again the travelable area while excluding the object 200B. With this operation, it is possible to achieve a travel with reduced discomfort feeling of the driver of the vehicle 2B while avoiding a contact to the object 200B.

Figure 15:
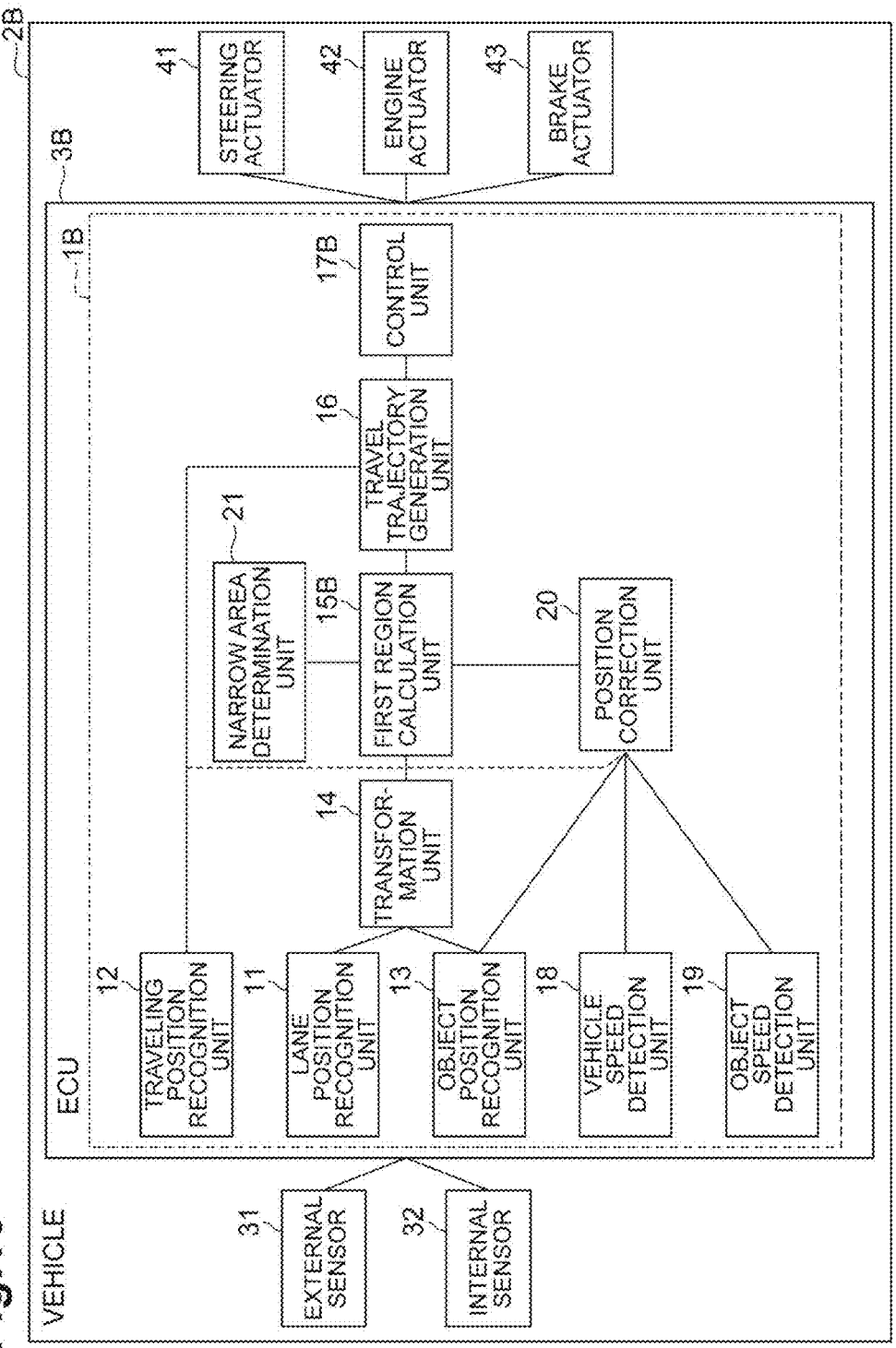
FIG. 15 is a block diagram describing a configuration of a vehicle including a travel control apparatus in a third embodiment.

FIG. 15 is a block diagram describing a configuration of a vehicle 2B including the travel control apparatus 1B in the third embodiment. The vehicle 2B includes an ECU 3B, an external sensor 31, an internal sensor 32 and the steering actuator 41, an engine actuator 42 and a brake actuator 43. The ECU 3B is an electronic control unit including a central processing unit (CPU), read only memory (ROM), random access memory (RAM), and the like. The ECU 3B may be configured with a plurality of ECUs. The ECU 3B is connected to the external sensor 31, the internal sensor 32 and the steering actuator 41, the engine actuator 42, and the brake actuator 43 via a network that communicates using a controller area network (CAN) communication circuit, and performs a mutual communication.

The ECU 3B is hardware that configures the travel control apparatus 1B, and includes the lane position recognition unit 11, the travelling position recognition unit 12, the object position recognition unit 13, the transformation unit 14, the first area calculation unit (area calculation unit) 15B, the travel trajectory generation unit 16, the control unit 17B, the vehicle speed detection unit 18, the object speed detection unit 19, the position correction unit 20, and the narrow area determination unit 21 as the functions. That is, the travel control apparatus 1B includes the lane position recognition unit 11, the travelling position recognition unit 12, the object position recognition unit 13, the transformation unit 14, the first area calculation unit 15B, the travel trajectory generation unit 16, the control unit 17B, the vehicle speed detection unit 18, the object speed detection unit 19, the position correction unit 20, and the narrow area determination unit 21.

Figure 16A:
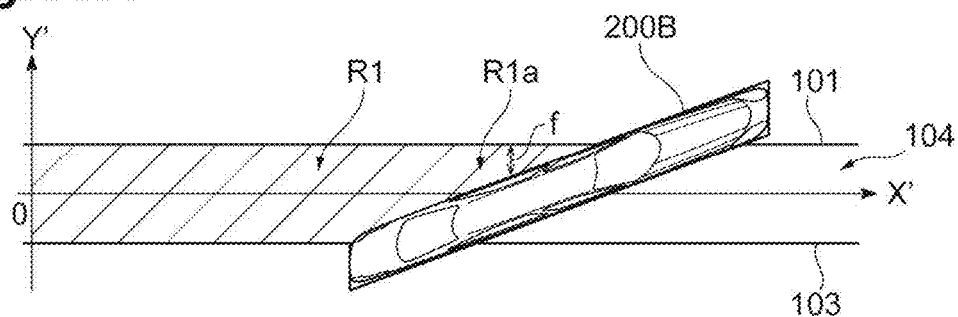
FIG. 16A to FIG. 16C are diagrams describing a travelable area that includes a narrow area in the lane coordinate system.
Figure 16B:
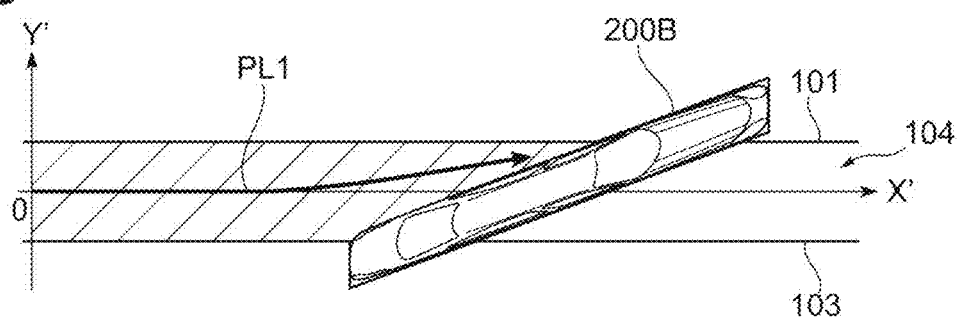
Figure 16C:
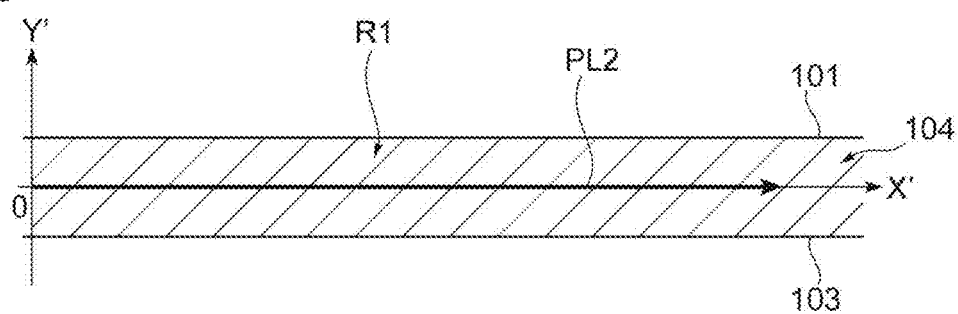

The narrow area determination unit 21 determines whether or not the first travelable area R1 calculated based on the temporal position of the object 200B includes a narrow area where the width in the second coordinate axis is equal to or smaller than a width threshold value. FIG. 16A to FIG. 16C are diagrams describing the first travelable area R1 that includes a narrow area in the lane coordinate system. In 16A to FIG. 16C, the object 200B is assumed to be a vehicle changing a lane in front of the vehicle 2B. That is, the object 200B is assumed to have a lateral velocity toward the lane 104 in which the vehicle 2B is travelling. In this case, as illustrated in FIG. 16A, the object 200B is stretched to the second coordinate axis Y' direction and closes the lane 104. In this case, as illustrated in FIG. 16B, a travel trajectory PL1 of the vehicle 2B is a trajectory that moves to the left side as advancing toward the travelling direction.

Therefore, among the first travelable area R1 calculated by the first area calculation unit 15B, the narrow area determination unit 21 determines an area in which the width f becomes equal to or smaller than the predetermined value as a narrow area R1a. The predetermined value is a threshold value to determine whether or not the travelable area is the narrow area R1a.

When the narrow area determination unit 21 determines that the first travelable area R1 includes the narrow area R1a, the first area calculation unit 15B calculates the first travelable area R1 again while excluding the object 200B. The re-calculation by the first area calculation unit 15B is performed using a method same as that in the usual (previous) calculation. In this way, the travel trajectory PL1 of the vehicle 2 illustrated in FIG. 16B becomes a straight line shaped travel trajectory PL2 as illustrated in FIG. 16C. Therefore, the travel control apparatus 1B can achieve a natural driving with respect to the vehicle changing the lane in front of the vehicle 2B.

In addition, the control unit 17B performs a speed control to follow the excluded object 200B. An automatic speed adjustment in which the speed of the vehicle 2B is automatically adjusted according to a distance to the followed object and a drive assistance in which the speed is controlled according to the distance to the followed object in cooperation with the speed adjustment by the driver of the vehicle 2B are included in the speed control. The control unit 17B outputs a control signal according to the distance to the followed object to the engine actuator 42 and the brake actuator 43. The engine actuator 42 changes (for example, changing a degree of opening a throttle) the amount of supplying air to the engine according to the control signal from the ECU 3B, and then, controls the driving force of the vehicle 2B. The brake actuator 43 controls a brake system according to the control signal from the ECU 3B, and then, controls a braking force given to the vehicle wheels of the vehicle 2B. In this way, it is possible to stand on the assumption of not overtaking the object 200B.

Other configurations of the travel control apparatus 1B are the same as that of the travel control apparatus 1A.

Figure 17:
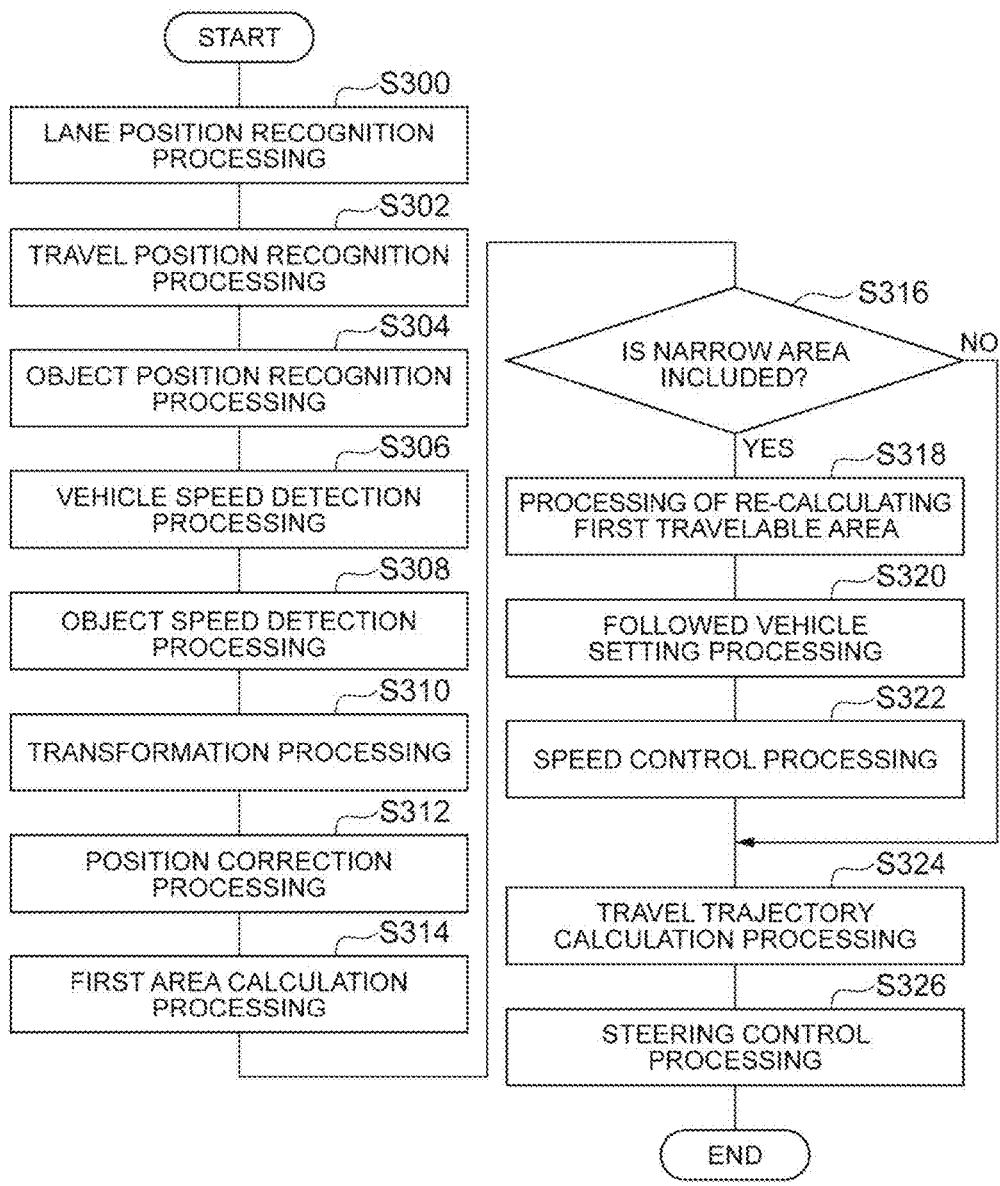
FIG. 17 is a flowchart illustrating travel control processing in the travel control apparatus in FIG. 15.

Next, the travel control processing in the travel control apparatus 1B will be described. FIG. 17 is a flowchart illustrating the travel control processing in the travel control apparatus 1B in FIG. 15. The travel control processing illustrated in FIG. 17 is started when a signal to start the operation of the travel control apparatus 1B is acquired.

Lane position recognition processing (S300), travel position recognition processing (S302), object position recognition processing (S304), vehicle speed detection processing (S306), object speed detection processing (S308), transformation processing (S310), position correction processing (S312), first area calculation processing (S314) illustrated in FIG. 17 are the same as the lane position recognition processing (S200), the travel position recognition processing (S202), the object position recognition processing (S204), the vehicle speed detection processing (S206), the object speed detection processing (S208), the transformation processing (S210), the position correction processing (S212), the first area calculation processing (S214) in the travel control apparatus 1A.

As determination processing (S316), the narrow area determination unit 21 of the travel control apparatus 1B determines whether or not the first travelable area R1 calculated based on the temporal position includes the narrow area R1a where the width in the second coordinate axis direction is equal to or smaller than the width threshold value. When it is determined that the first travelable area R1 includes the narrow area R1a in the determination processing (S316), the travel control apparatus 1B executes the re-calculating processing (S318).

As re-calculation processing (S318), the first area calculation unit 15B of the travel control apparatus 1B calculates the first travelable area R1 again while excluding the object 200B. Subsequently, as followed vehicle setting processing (S320), the control unit 17B sets the excluded object 200B as a followed vehicle. Then, as speed control processing (S322), the control unit 17B performs the speed control to follow the object 200B. When it is determined that the first travelable area R1 does not include the narrow area R1a in the determination processing (S316) and when the speed control processing (S322) ends, travel trajectory calculation processing (S324) is executed.

The travel trajectory calculation processing (S324) and the steering control processing (S326) in the travel control apparatus 1B are the same as the travel trajectory calculation processing (S224), steering control processing (S226) in the travel control apparatus 1A.

When the steering control processing (S326) ends, the travel control processing illustrated in FIG. 17 ends. In a case where the travel control processing ends, when a signal to end the operation of the travel control apparatus 1B is not acquired, the processing starts again from the lane position recognition processing (S300). As described above, the travel control processing illustrated in FIG. 17 is repeatedly executed until the signal to end the operation of the travel control apparatus 1B is acquired.

A described above, the travel control apparatus 1B in the present embodiment achieves an effect same as that of the travel control apparatuses 1 and 1A. In addition, in the travel control apparatus 1B in the present embodiment, when the object 200B is treated as a stationary object in the lane coordinate system, and when the first travelable area R1 includes the narrow area R1a in the lane coordinate system, the object 200B is not treated as the stationary object but is treated as a preceding vehicle to be followed by the vehicle 2B. Therefore, the travel control apparatus 1B calculates the first travelable area R1 again in the lane coordinate system while excluding the object 200B which is treated as the preceding vehicle. Therefore, even when the object 200B such as another vehicle changing the lane in front of the vehicle is present, it is possible to calculate the first travelable area R1. Furthermore, the speed control is performed by the control unit 17B with the excluded object as the followed object. Therefore, the travel control apparatus 1B can surely avoid the contact of the vehicle 2B and the object 200B. That is, the travel control apparatus 1B can avoid the contact of the vehicle 2B and the object 200B not only when the moving object 200B is treated as the preceding vehicle but also when the stationary object blocking the lane is treated as the preceding vehicle. In addition, the travel control apparatus 1B can perform a travel control close to a natural driving such as a driving to follow another vehicle changing the lane in front of the vehicle 2B as a reference.

Fourth Embodiment

A travel control apparatus 1C in a fourth embodiment is different from the travel control apparatus 1B in the third embodiment in a point that the apparatus 1C includes a first area calculation unit 15C that selects the excluded object differently from the first area calculation unit 15A. Hereinafter, the description regarding the configuration same as that in the travel control apparatus 1B in the third embodiment will be omitted, and a difference in the configuration will be mainly described.

First, a basic principle of the travel control apparatus 1C will be described. In the third embodiment, it is assumed that one object closes the lane in front of the vehicle 2. In a traffic scene, for example, it may be assumed that a stationary object such as a fallen object and a vehicle may combinedly close the lane in front of the vehicle 2B. In this case, since the travel control apparatus 1B performs the speed control with treating the fallen object as a preceding vehicle, the vehicle 2 stops. However, if it is possible to follow a vehicle closing the road, the travelling becomes a travelling close to a natural driving such as a traveling avoiding the fallen object. When a plurality of objects closes the lane in front of a vehicle 2C, the travel control apparatus 1C realizes a travelling close to a natural driving by determining a target of the preceding vehicle according to the speed.

Figure 18:
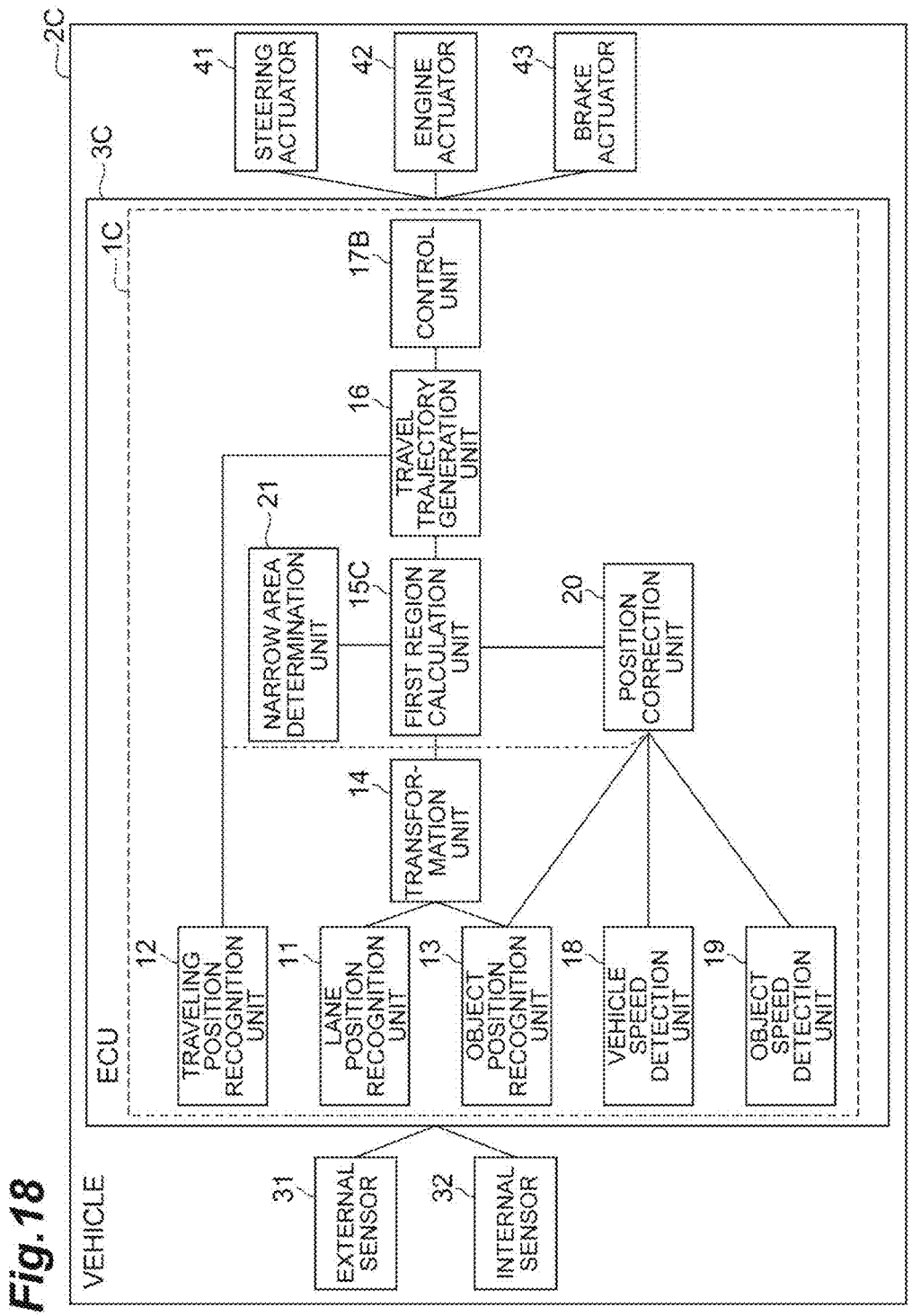
FIG. 18 is a block diagram describing a configuration of a vehicle including a travel control apparatus in a fourth embodiment.

FIG. 18 is a block diagram describing a configuration of the vehicle 2C including the travel control apparatus 1C in the fourth embodiment. The vehicle 2C includes an ECU 3C, the external sensor 31, the internal sensor 32 and the steering actuator 41, the engine actuator 42 and a brake actuator 43. The ECU 3C is an electronic control unit including a central processing unit (CPU), read only memory (ROM), random access memory (RAM), and the like. The ECU 3C may be configured with a plurality of ECUs. The ECU 3C is connected to the external sensor 31, the internal sensor 32 and the steering actuator 41, the engine actuator 42, and the brake actuator 43 via a network that communicates using a controller area network (CAN) communication circuit, and performs a mutual communication.

The ECU 3C is hardware that configures the travel control apparatus 1C, and includes the lane position recognition unit 11, the travelling position recognition unit 12, the object position recognition unit 13, the transformation unit 14, the first area calculation unit (area calculation unit) 15C, the travel trajectory generation unit 16, the control unit 17B, the vehicle speed detection unit 18, the object speed detection unit 19, the position correction unit 20, and the narrow area determination unit 21 as the functions. That is, the travel control apparatus 1C includes the lane position recognition unit 11, the travelling position recognition unit 12, the object position recognition unit 13, the transformation unit 14, the first area calculation unit 15C, the travel trajectory generation unit 16, the control unit 17B, the vehicle speed detection unit 18, the object speed detection unit 19, the position correction unit 20, and the narrow area determination unit 21.

Figure 20A:
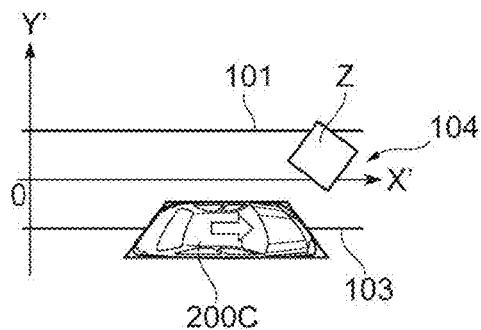
FIG. 20A to FIG. 20C are diagrams describing the travelable area including the narrow area in the lane coordinate system.
Figure 20B:
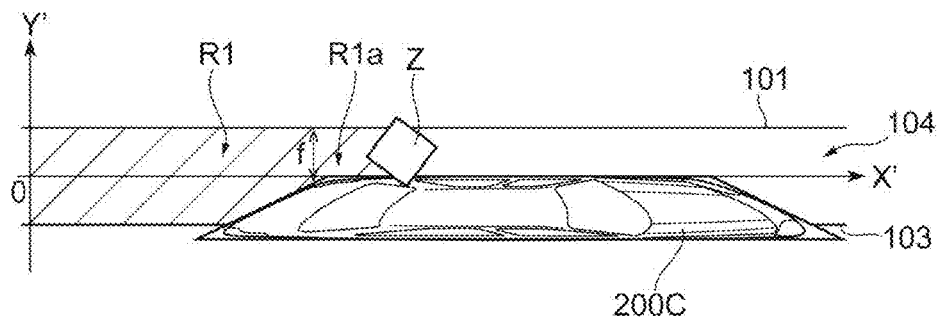
Figure 20C:
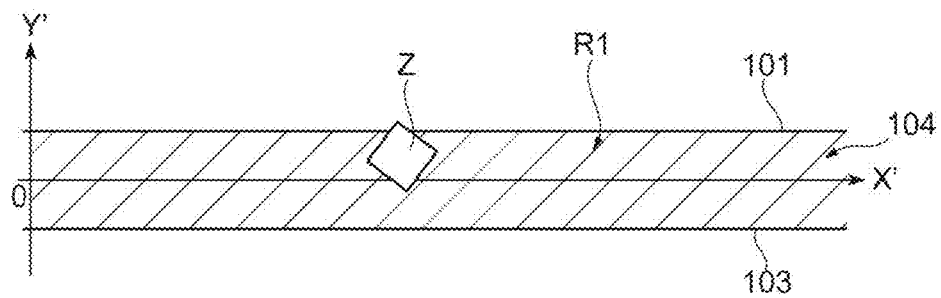

Hereinafter, a case where a plurality of objects is recognized by the object position recognition unit 13 will be described. FIG. 19 is a diagram describing an example of lane boundary lines 101 and 103 and positions of the objects 200C and Z in the XY object plane coordinate system. As illustrated in FIG. 19, a plurality of objects 200C and Z is present in the lane 104 in front of the vehicle 2C. FIG. 20A to FIG. 20C are diagrams describing the travelable area including the narrow area in the lane coordinate system. FIG. 20A is a diagram describing the lane boundary lines 101 and 103, and the object 200C and Z transformed to the lane coordinate system based on FIG. 19. FIG. 20B is a diagram describing each object corrected based on each of the temporal positions of each object. When the position and speed of each of the plurality objects are detected, the position correction unit 20 performs processing to correct the positions of the object 200C and Z in the lane coordinate system to the temporal positions. The narrow area determination unit 21 determines whether or not the first travelable area R1 calculated based on the temporal positions of the plurality of objects 200C and Z includes the narrow area R1a. In FIG. 20B, a case where the first travelable area R1 includes the narrow area R1a is illustrated.

In this case, the first area calculation unit 15C calculates the first travelable area R1 again based on the remaining object after excluding the object having the highest speed among the plurality of objects 200C and Z that form the narrow area R1a. The plurality of objects that form the narrow area R1a is the object that overlaps the outer edge of the narrow area R1a. For example, when an object other than the objects 200C and Z is detected, the first area calculation unit 15C specifies the object 200C and Z that form the narrow area R1a based on the position of each object. The object 200C is a vehicle and the object Z is a fallen object. Therefore, the first area calculation unit 15C calculates the first travelable area R1 again based on the object Z while excluding the object 200C. In this way, as illustrated in FIG. 20C, the first travelable area R1 for avoiding the object Z is calculated. The control unit 17B performs a speed control to follow the excluded object 200C having the highest speed.

Other configurations of the travel control apparatus 1C are the same as that of the travel control apparatus 1B. In addition, the operation of the travel control processing in the travel control apparatus 1C is the same as the travel control processing in the travel control apparatus 1A except the point that the excluded object is selected.

As described above, when the object 200C and Z are treated as stationary objects in the lane coordinate system and when a plurality of object is present and the lane 104 in front of the vehicle 2C is closed by those objects, the travel control apparatus 1C in the present embodiment treats the object 200C having the highest speed among the plurality of objects forming the narrow area R1a as a preceding vehicle, and then, can calculate the first travelable area R1 again based on the position of the other remaining object Z. By selecting the preceding vehicle as described above, it becomes possible to travel with a driving close to the general driving such as the driving with treating an object having the highest speed as a preceding vehicle while avoiding the collision with an object having a low speed.

The present invention can be embodied in various forms to which various changes or modifications are applied based on the embodiments described above, based on knowledge of those skilled in the art. In addition, a modification example to the embodiment can be configured as described below using the technical aspects disclosed in the embodiments described above.

Modification of the Configuration

In the embodiments described above, the example is described as the external sensor 31 including a camera, radar, and a LIDAR. However, the external sensor 31 may include at least one of the camera, radar, and the LIDAR. That is, the travel control apparatus may recognize the lane boundary lines and the object using at least one of the camera, radar, and the LIDAR.

In the embodiments described above, the vehicle 2 may include map information and a GPS receiver. In this case, the travel control apparatus can acquire the position of the lane boundary lines in front of the vehicle 2 based on the map information and the position of the vehicle 2 based on the GPS receiver.

In the first embodiment, the example is described as the transformation unit 14 transforms the end points p1 to p4 of the object 200 to those in the lane coordinate system. However, the sampling can be freely performed without being limited to the end points or the number of points four. In addition, in FIG. 3, with regard to a line segment configured with the end points p1 and p2 close to the lane center line K, the outer edge of the object 200 in the lane coordinate system can accurately be described by sampling the middle point of the line segment. In this way, a side surface of the object 200 which has a higher possibility of having a relation with the vehicle 2 can accurately be described. Therefore, it is possible to accurately calculate the travelable area.

In the first embodiment, the example is described as the travel trajectory generation unit 16 generates the second travelable area R2 from the first travelable area R1 and generates the travel trajectory in the second travelable area R2, but is not limited thereto. The travel trajectory generation unit 16 may generate the target travel trajectory by generating the travel trajectory in the first travelable area R1 and performing the inverse transformation on the generated travel trajectory.

An observation error may be included in each physical quantity in Equation (1) described in the second embodiment. In addition, the example is described as the overtaking time is the time until the front end portion of the moving vehicle 2A and the rear end portion of the moving object 200A are coincident with each other, but is not limited thereto. For example, instead of the front end portion of the vehicle 2A, the center of gravity position 2a of the vehicle 2A may be used or other portions of the vehicle 2A may be used. Similarly to the object 200A, instead of the rear end portion, a center of gravity position may be used. In addition, in determining the coincidence, it may be determined that the positions are coincident with each other when the difference in positions is within a predetermined range as well as the case of perfect coincidence. In addition, the overtaking time may be calculated using the current time and the relative speed between the vehicle 2A and the object 200A. For example, the current time can the time when the lane position recognition unit 11, the travelling position recognition unit 12, and the object position recognition unit 13 execute the recognition processing. The overtaking time can be the time that is obtained by, for example, adding the current time to the time obtained by dividing the distance on the way from the intersection point $Q_t$ which is the projected position of the front end portion of the vehicle 2 to the intersection point $Q_p$ which is the projected position of the rear end portion of the object 200A by the relative speed.

What is claimed is:

1. A travel control apparatus comprising:
   a processor configured to:
   recognize, in a first coordinate system that is a plane coordinate system, plane coordinate positions of lane boundary lines in front a vehicle on lane in which the vehicle travels;
   recognize, in the plane coordinate system, a plane coordinate travelling position of the vehicle in the lane;
   recognize, in the plane coordinate system, a plane coordinate position of an object present around the vehicle;
   perform a coordinate transformation process that projects the lane boundary lines and the object recognized in the plane coordinate system onto a second coordinate system that is different from the first coordinate system, the second coordinate system being a lane coordinate system in which a center line of the lane is a first coordinate axis and an axis orthogonal to the first coordinate axis is a second coordinate axis;
   calculate a travelable area in which the vehicle can travel in the lane coordinate system based on the projected lane boundary lines and the projected object in the lane coordinate system;
   generate a travel trajectory of the vehicle in the plane coordinate system based on the calculated travelable area and the travelling position; and
   perform a steering control on the vehicle based on the generated travel trajectory.

2. The travel control apparatus according to claim 1, wherein
   the processor is further configured to:
   detect a speed of the vehicle;
   detect a speed of the object;
   correct the position of the projected object in the lane coordinate system to a temporal position which is a position of the object in the lane coordinate system at a time when the vehicle overtakes the object, based on the position and speed of the object in the lane coordinate system and the travelling position and speed of the vehicle in the lane coordinate system; and
   calculate the travelable area based on the temporal position of the object.

3. The travel control apparatus according to claim 2, wherein the processor is further configured to:
   determine whether or not the travelable area calculated based on the temporal position of the object includes a narrow area in which a width in the second coordinate axis direction is equal to or smaller than a width threshold value;
   calculate the travelable area again while excluding the object when the processor determines that the travelable area includes the narrow area; and
   perform a speed control to follow the excluded object.

4. The travel control apparatus according to claim 3, wherein the processor is further configured to:
   perform processing to correct the position of the object in the lane coordinate system to the temporal position when positions and speeds of each of a plurality of objects are detected;
   determine whether or not the travelable area calculated based on the temporal positions of the plurality of objects includes the narrow area;
   calculate the travelable area again based on the remaining object after excluding the object having the highest speed among the plurality of objects forming the narrow area when the processor determines that the travelable area includes the narrow area; and
   perform the speed control to follow the excluded object having the highest speed.

5. The travel control apparatus according to claim 1, wherein the coordinate transformation process includes:
   defining object intersection points by drawing orthogonal lines from end points of the object to the center line of the lane, respectively;
   defining a vehicle intersection point by drawing an orthogonal line from a center of gravity position of the vehicle to the center line of the lane; and
   calculating distances from the defined vehicle intersection point to the object intersection points, respectively, on the center line of the lane.

6. The travel control apparatus according to claim 5, wherein the coordinate transformation process uses a curvature function.

7. The travel control apparatus according to claim 1, wherein the plane coordinate system is a fixed coordinate system.

8. The travel control apparatus according to claim 1, wherein the plane coordinate system is a coordinate system having two axes orthogonal to each other with the position of the vehicle as an origin.

9. The travel control apparatus according to claim 1, wherein the lane coordinate system is a coordinate system associated with a shape of the lane.

* * * * *